US012165261B2

(12) United States Patent
Gogin et al.

(10) Patent No.: US 12,165,261 B2
(45) Date of Patent: Dec. 10, 2024

(54) INTERACTIVE 3D ANNOTATION TOOL WITH SLICE INTERPOLATION

(71) Applicant: GE Precision Healthcare LLC, Milwaukee, WI (US)

(72) Inventors: Nicolas Gogin, Chatenay Malabry (FR); Jerome Knoplioch, Neuilly (FR); Vincent Morard, Chassieu (FR)

(73) Assignee: GE Precision Healthcare LLC, Waukesha, WI (US)

( * ) Notice: Subject to any disclaimer, the term of this patent is extended or adjusted under 35 U.S.C. 154(b) by 339 days.

(21) Appl. No.: 17/645,221

(22) Filed: Dec. 20, 2021

(65) Prior Publication Data
US 2023/0196698 A1 Jun. 22, 2023

(51) Int. Cl.
*G06T 19/00* (2011.01)
*G06T 7/12* (2017.01)
(Continued)

(52) U.S. Cl.
CPC ............... *G06T 19/00* (2013.01); *G06T 7/12* (2017.01); *G06T 7/174* (2017.01); *G06T 11/008* (2013.01);
(Continued)

(58) Field of Classification Search
CPC ......... G06T 19/20; G06T 19/00; G06T 7/174; G06T 7/12; G06T 11/008; G06T 2211/40;
(Continued)

(56) References Cited

U.S. PATENT DOCUMENTS 8,655,069 B2 2/2014 Rother et al.
9,275,302 B1 * 3/2016 Yan .......................... G06T 7/73
(Continued)

FOREIGN PATENT DOCUMENTS

EP 3 731 179 A1 10/2020
EP 3731179 10/2020

OTHER PUBLICATIONS

Chun-Hung Chao et al.: "Interactive Radiotherapy Target Delineation with 3D-Fused Context Propagation", arxiv.org, Online Library of the Cornell University, Ithaca, NY, USA, Dec. 12, 2020 (Dec. 12, 2020); https://arxiv.org/pdf/2012.06873.pdf ; XP081836982.
(Continued)

*Primary Examiner* — John B Strege
(74) *Attorney, Agent, or Firm* — Amin, Turocy & Watson, LLP

(57) ABSTRACT

A 3D segmentation editing system accurately updates the segmentations of non-edited images of a 3D scan to reflect segmentation edits applied to other images of the scan using localized interpolation. In one or more embodiments, rather than replacing the entireties of the initial segmentations of non-edited images with newly generated, globally interpolated segmentations, the segmentation editing system applies a distance-based criterion to the interpolation of segmentation edits, such that only portions of the segmentations of the non-edited images that correspond to areas that were manually annotated in the edited images will be modified by the interpolation process, and the initial segmentations will be maintained outside of those edited areas. In this way, the system merges the interpolated segmentation with the initial segmentation for each non-edited image in a manner that mitigates unreliable modifications to the initial segmentations in areas far from the edited areas.

20 Claims, 15 Drawing Sheets

(51) Int. Cl.
  *G06T 7/174* (2017.01)
  *G06T 11/00* (2006.01)
  *G06T 19/20* (2011.01)
  *G06V 30/184* (2022.01)

(52) U.S. Cl.
  CPC ............ *G06T 19/20* (2013.01); *G06V 30/184* (2022.01); *G06T 2219/004* (2013.01); *G06T 2219/2016* (2013.01); *G06T 2219/2021* (2013.01)

(58) Field of Classification Search
  CPC ....... G06T 2219/004; G06T 2219/2016; G06T 2219/2021; G06T 2200/24; G06T 2210/41; G06V 30/184; G16H 30/40
  See application file for complete search history.

(56) References Cited

U.S. PATENT DOCUMENTS

| | | | |
|---|---|---|---|
| 2012/0087561 A1 | 4/2012 | Guetter | |
| 2013/0033419 A1* | 2/2013 | Dror .................. | G06T 7/12 382/128 |
| 2014/0298270 A1* | 10/2014 | Wiemker ............. | G06T 7/174 715/849 |
| 2016/0093110 A1 | 3/2016 | Waschbusch et al. | |
| 2018/0047168 A1* | 2/2018 | Chen .................. | G06T 7/11 |
| 2018/0182103 A1* | 6/2018 | Syeda-Mahmood ..... | G06T 7/32 |
| 2023/0333860 A1* | 10/2023 | Doreau ............... | G06F 9/44505 |
| 2023/0402156 A1* | 12/2023 | Londono ............... | G16H 30/40 |

OTHER PUBLICATIONS

EP application 22211370.6 filed Dec. 5, 2022—extended Search Report issued May 15, 2023; 14 pages.

"Quick manual segmentation with contour interpolation," PerkLab Research, Sep. 20, 2017, https://www.youtube.com/watch?app=desktop&v=u93kl1MG6lc, accessed Dec. 20, 2021, 3 pages.

Liao et al., "Iteratively-Refined Interactive 3D Medical Image Segmentation with Multi-Agent Reinforcement Learning", IEEE/CVF Conference on Computer Vision and Pattern Recognition, 2020, pp. 9391-9399.

Schenk et al., "Efficient Semiautomatic Segmentation of 3D Objects in Medical Images", Medical Image Computing and Computer Assisted Intervention Society, 2000, pp. 186-195.

"Quick Manual Segmentation with Contour Interpolation", Youtube, online available at <https://www.youtube.com/watch?v=u93kl1MG6lc>, Sep. 20, 2017, 2 pages.

* cited by examiner

EDITED TOP IMAGE

EDITED BOTTOM IMAGE

INTERACTIVE 3D ANNOTATION TOOL WITH SLICE INTERPOLATION

TECHNICAL FIELD

The subject matter disclosed herein relates generally to image editing, and, more particularly, editing of three-dimensional segmentations of two-dimensional images.

BACKGROUND

Medical imaging techniques, such as computed tomography (CT) scans or other such 3D imaging techniques, yield a series of two-dimensional (2D) images, or slices, that together image a 3D volume of the scanned subject. To facilitate analysis, these 2D images are often subjected to a process known as 3D segmentation, whereby areas of interest within a 2D image plane—either the acquisition plane of the 3D scan or another plane—are manually delineated or labeled. For example, 3D segmentation can identify and delineate the boundaries of an organ, a tumor, or another object or area of interest.

3D segmentation tools generate an initial 3D segmentation on a set of 2D planes or slices; e.g., based on boundary detection or other such techniques. In some cases, this initial segmentation may not accurately delineate all areas of interest within the 2D planes, either due to unclear borders between the area of interest and adjacent areas or lack of knowledge of the areas deemed to be of interest. This necessitates manual editing of some portions of the initial 3D segmentation. However, available 3D segmentation tools are not well suited for editing of existing segmentations.

The above-described deficiencies of 3D segmentation tools are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments provide a system, comprising a user interface component configured to receive, via interaction with one or more display interfaces, annotation input that defines a manual edit to a segmentation of a two-dimensional (2D) image, wherein the 2D image is one of a set of 2D images of a three-dimensional (3D) scan of a subject; a 2D annotation component configured to apply the manual edit to the segmentation to yield an edited segmentation for the 2D image; a 3D interpolation component configured to modify an initial segmentation of a non-edited image, of the set of 2D images, by interpolating the edited 3D segmentation to the non-edited image to yield an updated segmentation for the non-edited image; wherein the 3D interpolation component is configured to: maintain contours of the initial segmentation for portions of the updated 3D segmentation that do not satisfy a relationship criterion relative to an area corresponding to the manual edit, and modify contours, based on the interpolating, for portions of the updated segmentation that satisfy the relationship criterion relative to the area corresponding to the manual edit.

Also, In one or more embodiments, a method is provided, comprising receiving, by a system comprising a processor via interaction with one or more display interfaces, annotation input that defines a manual edit to a segmentation of a two-dimensional (2D) image, wherein the 2D image is one of a set of 2D images of a three-dimensional (3D) scan of a subject; applying, by the system, the manual edit to the segmentation to yield an edited segmentation for the 2D image; and modifying, by the system, an initial segmentation of a non-edited image, of the set of 2D images, by interpolating the edited segmentation to the non-edited image to yield an updated 3D segmentation for the non-edited image, wherein the modifying comprises: in response to determining that a first portion of the updated segmentation does not satisfy a relationship criterion relative to an area corresponding to the manual edit, maintaining a contour of the initial segmentation for the first portion, and in response to determining that a second portion of the updated segmentation satisfies the relationship criterion, modifying the second portion in accordance with the interpolating.

Also, according to one or more embodiments, a non-transitory computer-readable medium is provided having stored thereon instructions that, in response to execution, cause a system to perform operations, the operations comprising receiving, via interaction with one or more display interfaces, annotation input that defines a manual edit to a segmentation of a two-dimensional (2D) image, wherein the 2D image is one of a set of 2D images of a three-dimensional (3D) scan of a subject; modifying the segmentation of the 2D image in accordance with the manual edit to yield an edited segmentation for the 2D image; and modifying an initial segmentation of a non-edited image, of the set of 2D images, by interpolating the edited segmentation to the non-edited image to yield an updated 3D segmentation for the non-edited image, wherein the modifying comprises: maintaining contours of the initial segmentation for portions of the updated segmentation that do not satisfy a relationship criterion relative to an area corresponding to the manual edit, and modifying contours for portions of the updated segmentation satisfy the relationship criterion based on the interpolating.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
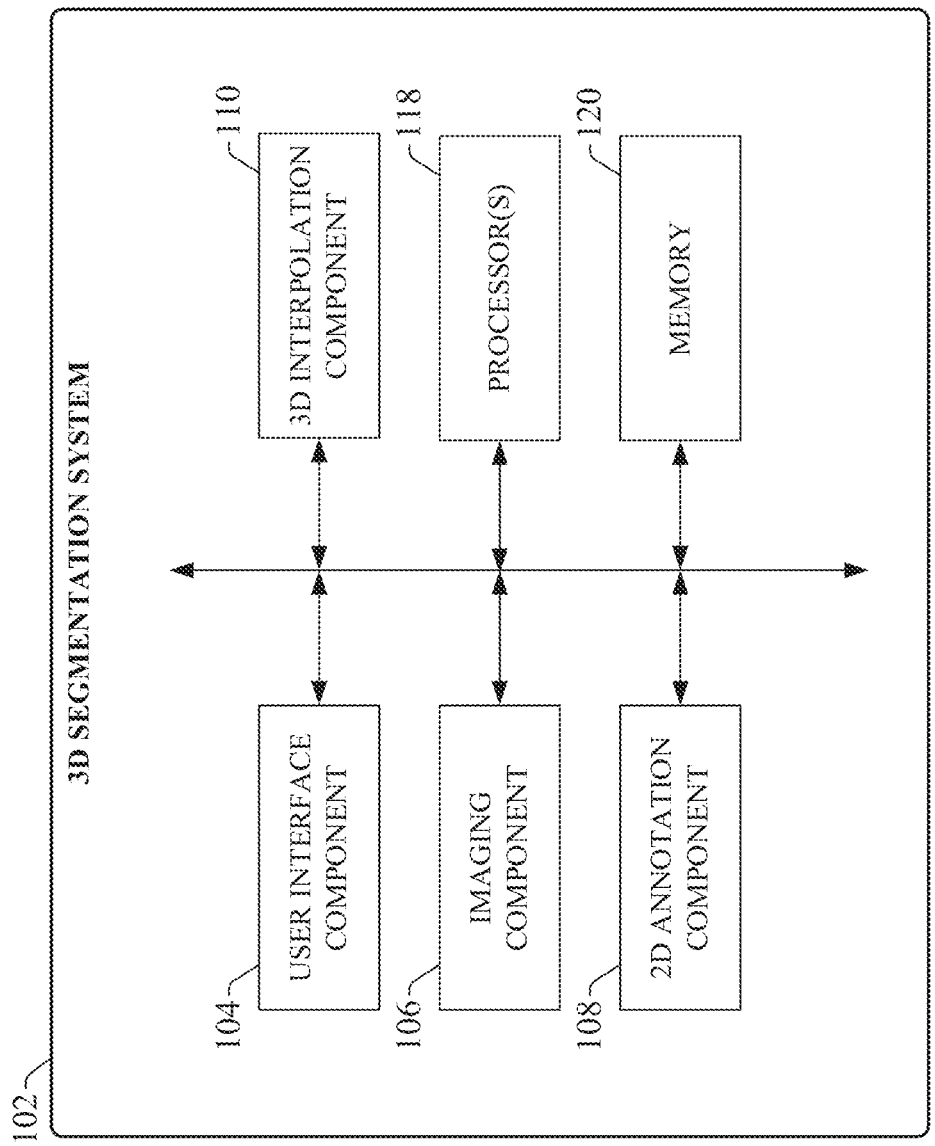
FIG. 1 is a block diagram of an example 3D segmentation system.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entities identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

FIG. 1 is a block diagram of an example 3D segmentation system 102 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

3D segmentation system 102 can include a user interface component 104, an imaging component 106, a 2D annotation component 108, a 3D interpolation component 110, one or more processors 118, and memory 120. In various embodiments, one or more of the user interface component 104, imaging component 106, 2D annotation component 108, 3D interpolation component 110, the one or more processors 118, and memory 120 can be electrically and/or communicatively coupled to one another to perform one or more of the functions of the 3D segmentation system 102. In some embodiments, one or more of components 104, 106, 108, and 110, can comprise software instructions stored on memory 120 and executed by processor(s) 118. 3D segmentation system 102 may also interact with other hardware and/or software components not depicted in FIG. 1. For example, processor(s) 118 may interact with one or more external user interface devices, such as a keyboard, a mouse, a display monitor, a touchscreen, or other such interface devices.

User interface component 104 can be configured to can be configured to receive user input and to render output to the user in any suitable format (e.g., visual, audio, tactile, etc.). In some embodiments, user interface component 104 can be configured to generate a graphical user interface on a client device that communicatively interfaces with the system 102, or on a native display component of the system 102 (e.g., a display monitor or screen). Input data that can be received via user interface component 104 can include, for example, image selection or navigation input for browsing and viewing 2D image planes, annotation input for editing 3D segmentations on the images, or other such input. Output data that can be rendered by the user interface component 104 can include, for example, 2D image content including 3D segmentation markings, alphanumeric feedback, or other such output.

Imaging component 106 can be configured to receive or generate 2D images acquired via 3D imaging. The 2D images represent a 3D volume of a subject, and can be obtained by scanning the subject using any suitable type of 3D imaging technology (e.g., CT scanning, CAT scanning, etc.). In some embodiments, the imaging component 106 can receive the 2D images from a separate 3D imaging system that performs 3D scanning. Alternatively, in some embodiments the imaging component 106 can itself perform the imaging scan on the subject.

2D annotation component 108 can be configured to, in accordance with editing input received via the user interface component 104, edit segmentations associated with selected 2D planes of a 3D imaging scan. 3D interpolation component 110 can be configured to apply interpolated segmentation edits to other 2D planes based on manual edits applied to the selected 2D planes. As will be described in more detail herein, the 3D interpolation component 110 can perform the interpolation in a localized manner, such that only portions of the segmentations that satisfy a distance or connectivity criterion relative to manually edited areas are altered by the interpolation.

The one or more processors 118 can perform one or more of the functions described herein with reference to the systems and/or methods disclosed. Memory 120 can be a computer-readable storage medium storing computer-executable instructions and/or information for performing the functions described herein with reference to the systems and/or methods disclosed.

Figure 2:
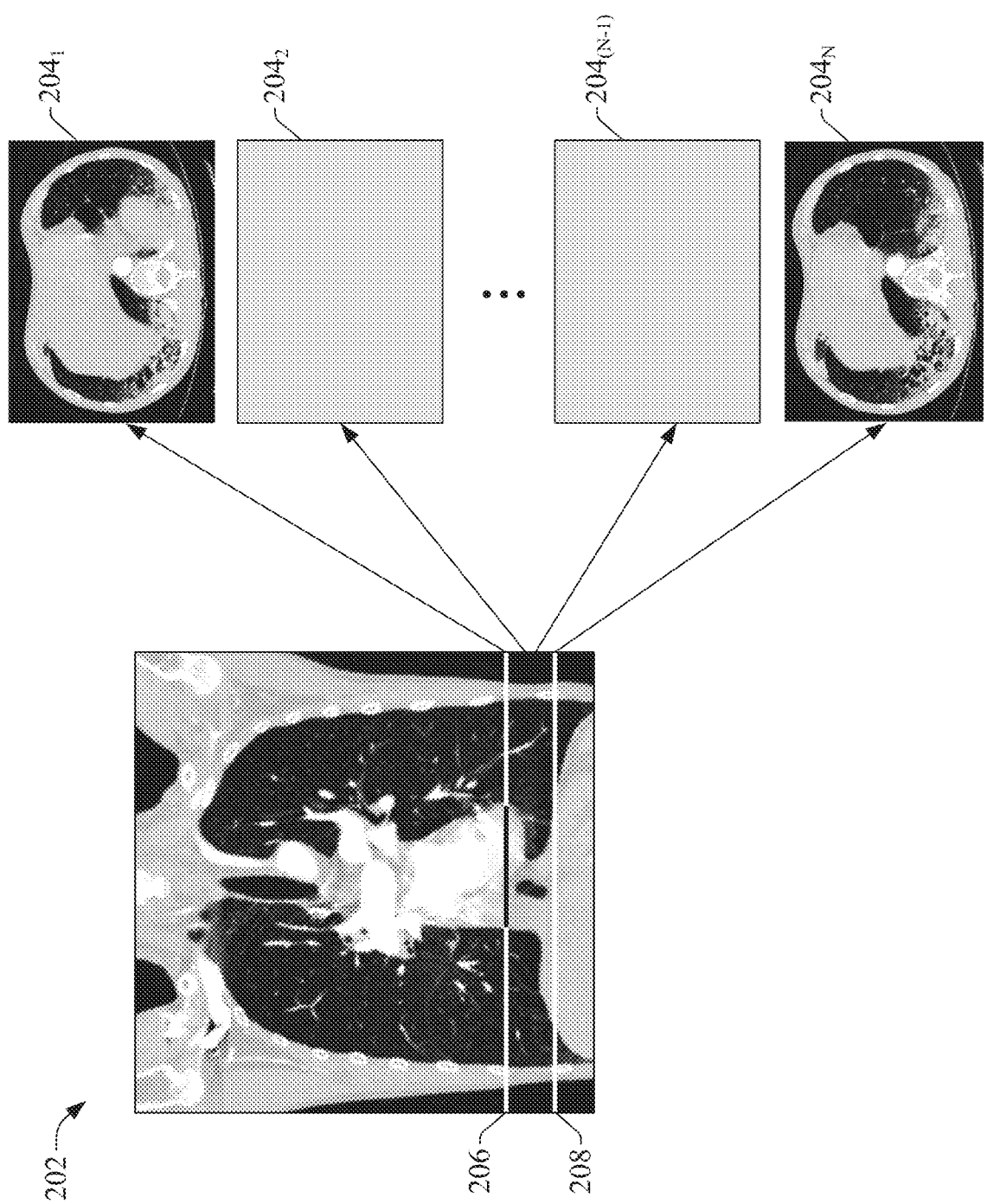
FIG. 2 is a diagram illustrating the concept of medical 3D imaging.

FIG. 2 is a diagram illustrating the concept of medical 3D imaging. In this example, a section of a patient's body—namely the volume between axial planes 206 and 208 on the example coronal image 202 of the patient's torso—is subjected to CT scanning or another medical imaging process to produce a series of 2D axial images 204 that, taken together, image the patent's lungs as a 3D volume. In the example depicted in FIG. 2, a series of N 2D images 204—also referred to as slices—are produced (where N is an integer), with the top image $204_1$ corresponding to the upper axial plane 206, the bottom image $204_N$ corresponding to the lower sagittal plane 208, and intermediate axial images $204_2$-$204_{(N-1)}$ corresponding to intermediate axial planes spaced between the upper and lower axial planes 206 and 208 (image content of only the top image $204_1$ and bottom image $204_N$ are depicted in FIG. 2). Each 2D image 204 represents an axial cross-sectional view of the subject.

Figure 3A:
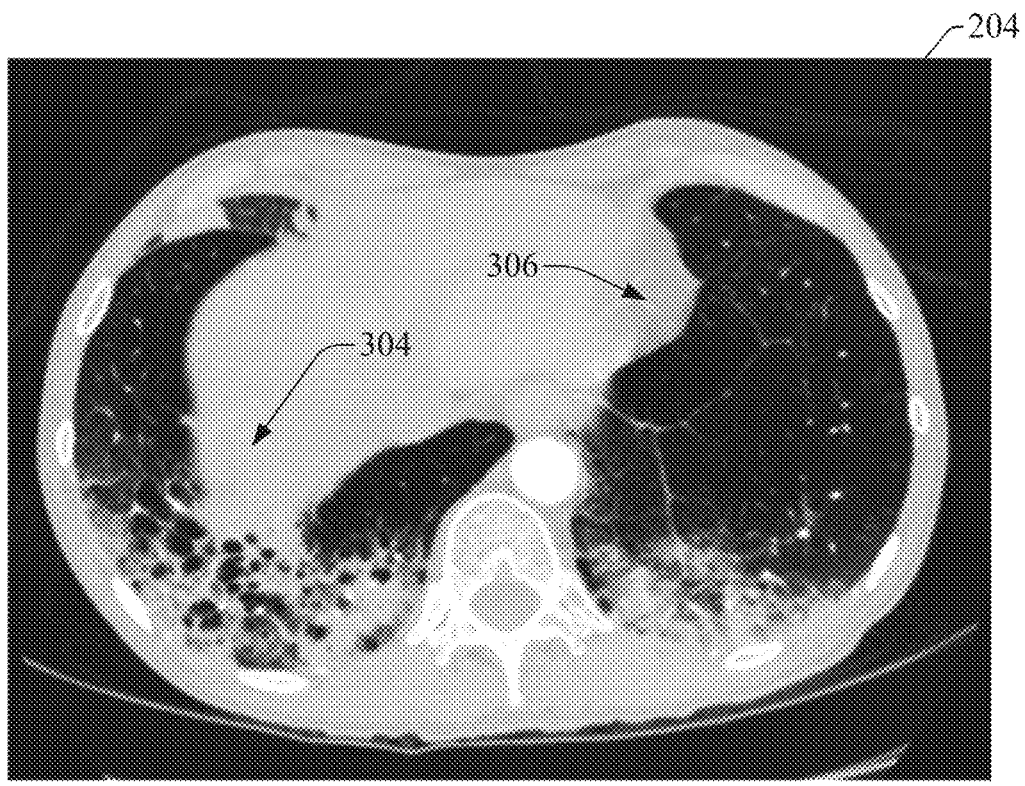
FIG. 3a is an example 2D image prior to segmentation.
Figure 3B:
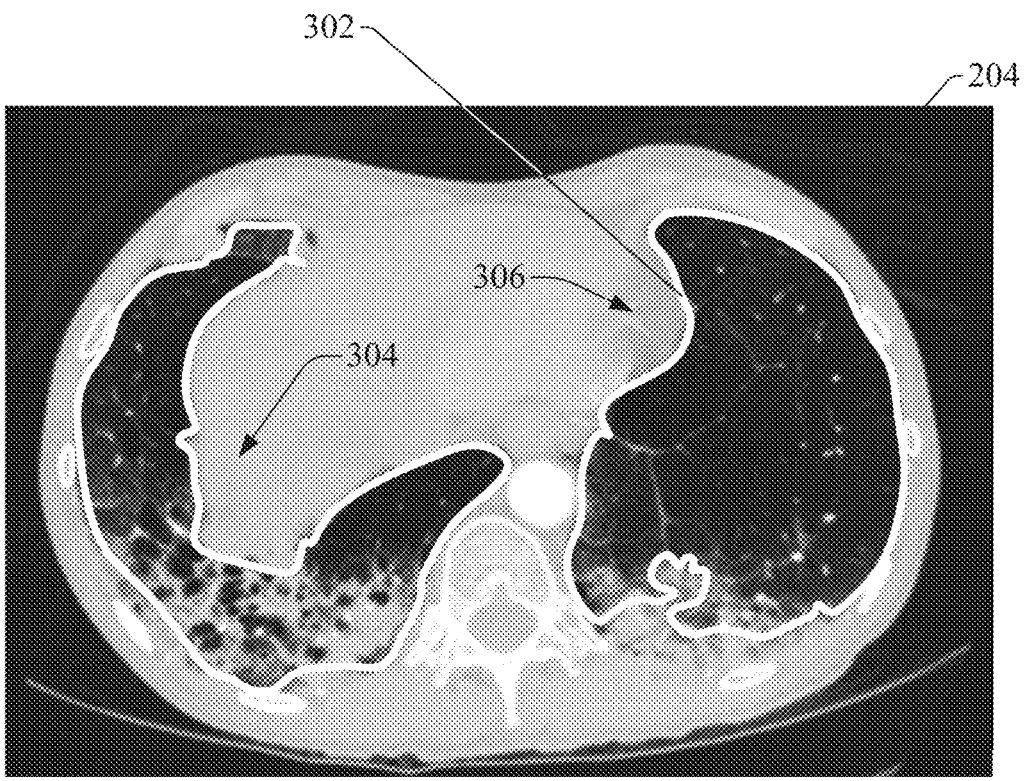
FIG. 3b is the example 2D image after 3D segmentation.

FIG. 3a is an example 2D image 204 prior to segmentation, and FIG. 3b is the example 2D image 204 after 3D segmentation. Once 3D image scanning is completed, a medical imaging system can analyze the content of the resulting 2D images 204 to identify gradients, borders, or contours within the images 204 and delineate these contours using a suitable labeling convention; e.g., by marking the identified contours with segmentation lines 302 (depicted as heavy white lines in FIG. 3b, although segmentation lines 302 may be rendered in any suitable color). This 3D segmentation process can identify and mark the contours of an organ, a tumor, a cavity, or another area of interest. In the example depicted in FIGS. 3a and 3b, the right lung 304 and left lung 306 have been delineated using segmentation lines 302.

Figure 4:
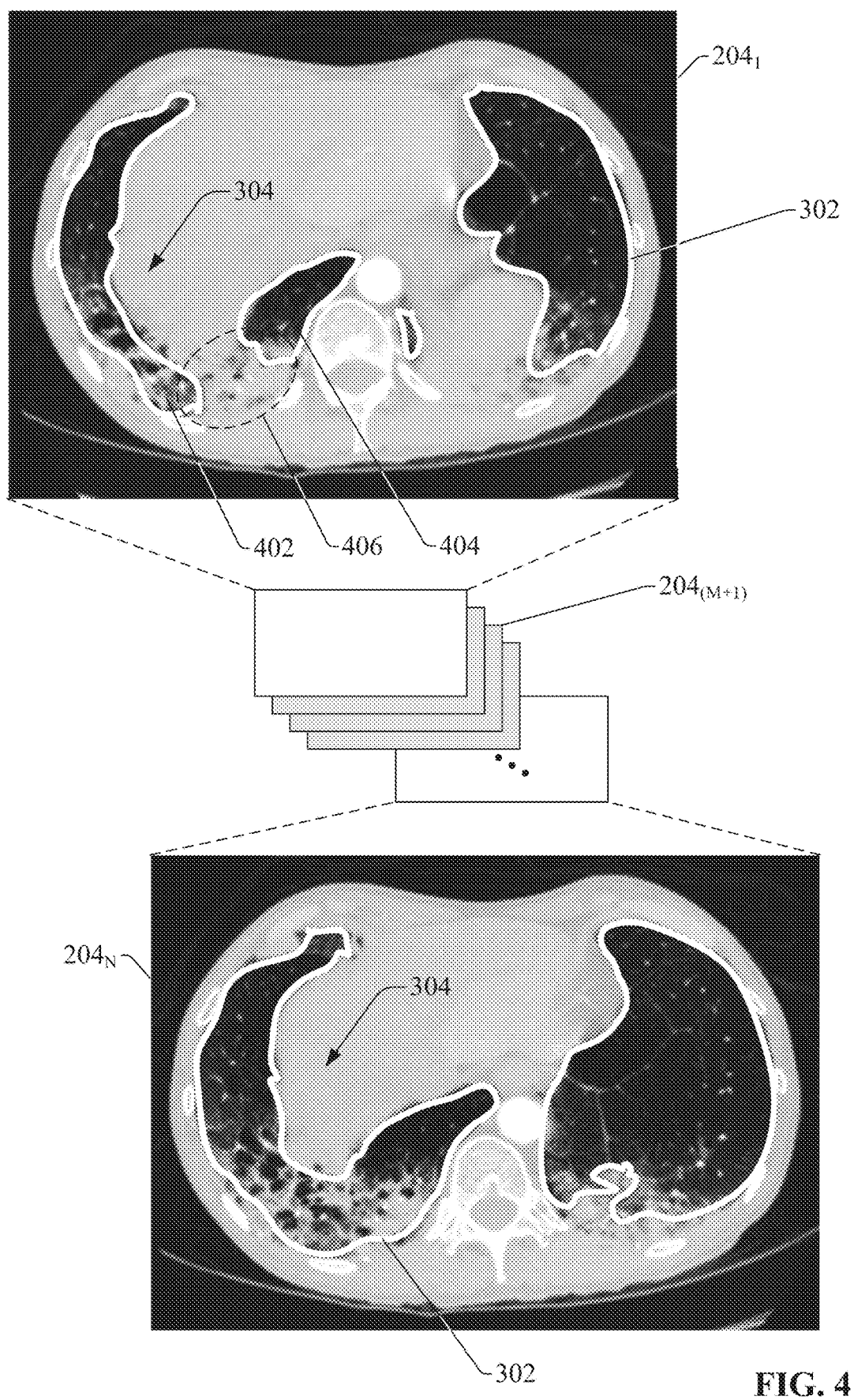
FIG. 4 depicts a series of 2D images to which an initial 3D segmentation has been applied.

This initial 3D segmentation may be generated based on analysis of the content of the images 204 using trained neural networks or machine learning algorithms. However, these initial segmentation lines 302 may not accurately reflect the areas of interest in all cases. FIG. 4 depicts a series of 2D images $204_1$-$204_N$ to which an initial 3D segmentation has been applied. Only the content of the top image $204_1$ and bottom image $204_N$ are shown in FIG. 4, with the intermediate images $204_{(1+M)}$ depicted in grey (where M is an integer representing an index number of a given intermediate image ranging from 1 to [N−2]). In this example, some segments of the border that defines the right lung 304 in the top image $204_1$ are indistinct due to discoloration of a section of the lung 304, and so the initial 3D segmentation generated by the imaging system has inaccurately delineated the right lung 304 as two separate areas 402 and 404, omitting a lighter colored portion 406 of the lung between these two delineated areas 402 and 404. In general, the initial 3D segmentation may yield any number of such inaccuracies in the segmentation lines 302 of one or more of the 2D images 204.

Some interactive segmentation tools allow users to manually edit—or annotate—selected segmentation lines 302 to correct inaccuracies in the initial segmentation. Using such tools, a user can erase and redraw selected portions of segmentation lines 302 to better conform to contours of areas interest. However, if inaccuracies exist in multiple 2D images 204 of the scan, manually editing each image 204 individually can be time consuming and may pose challenges if some images 204 have no clear gradients from which to judge the correct contours of the areas of interest.

Figure 5:
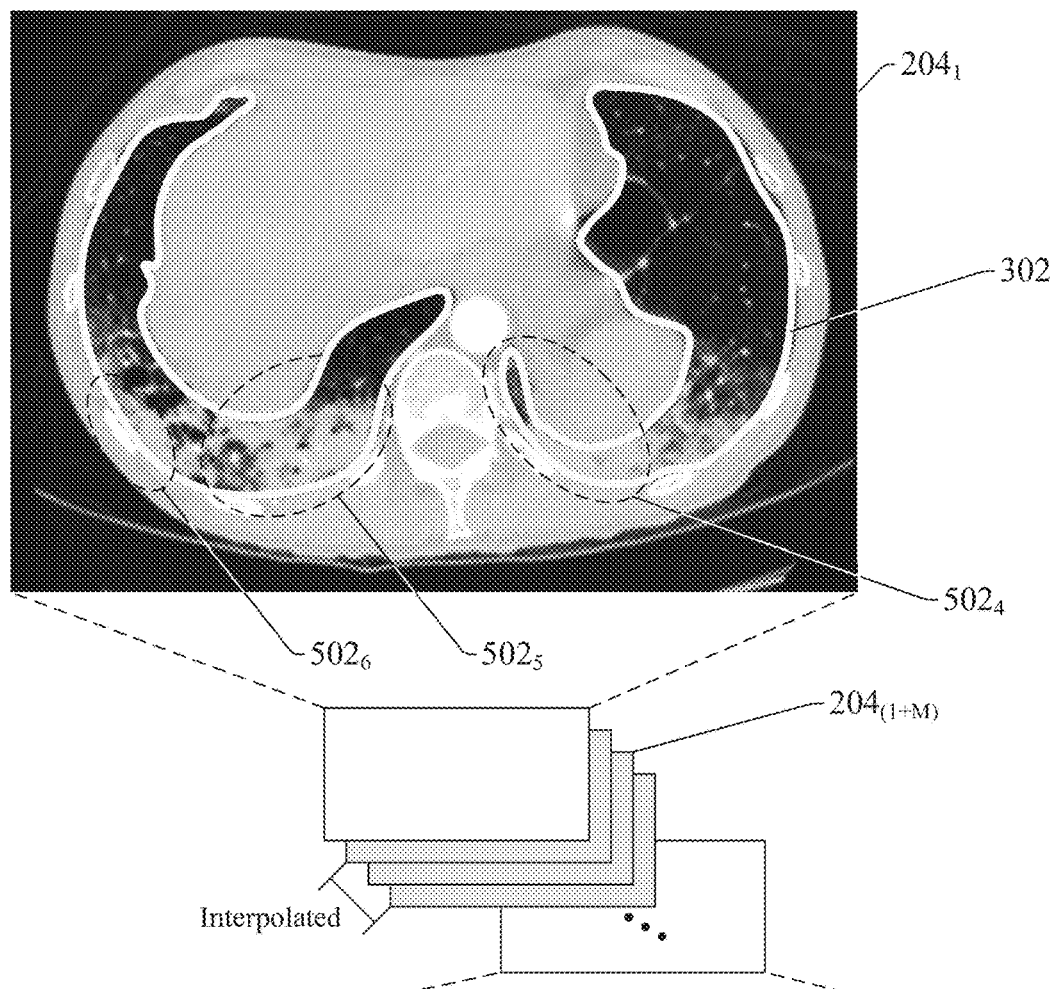
FIG. 5 illustrates an example scenario in which a top image and a bottom image of a set of 2D image slices have been annotated to correct the initial 3D segmentations of those images.
Figure 5:
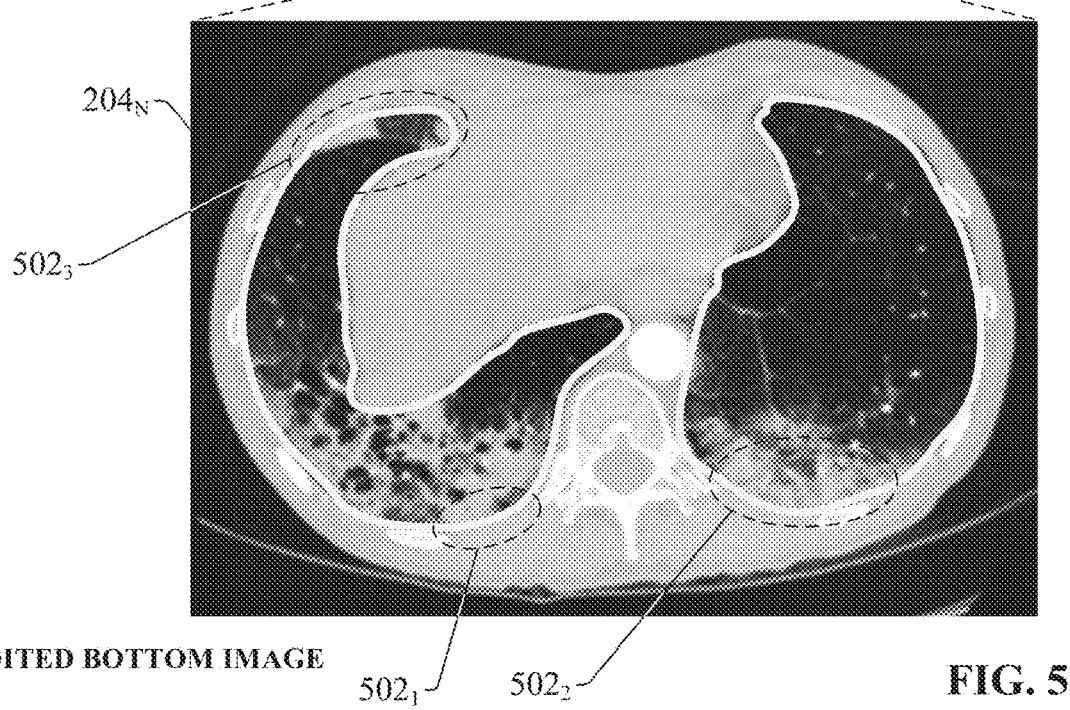

As an alternative to manually editing each individual 2D image 204, the segmentation lines 302 of one or more selected images 204 can be manually edited, and the imaging system can interpolate new segmentations for the other non-edited images 204 based on these manual edits (e.g., using linear interpolation). FIG. 5 illustrates an example scenario in which the top image $204_1$ and bottom image $204_N$ of FIG. 4 have been annotated using a manual editing tool to correct the initial 3D segmentations of those images. In this example, a user has annotated various segmentation areas 502 in those two images $204_1$ and $204_N$. These edits include a redrawing the segmentation lines 302 in area $505_5$ to include the portion of the right lung 304 that had been omitted from the initial segmentation, as well as various other edits to better align the segmentation lines 302 to the organ contours. Upon completion of these manual annotations to the selected subset of images 204 (the top and bottom images $204_1$ and $204_N$ in this example), the imaging system redraws the segmentations of the other 2D images 204 (in this example, intermediate images $204_{(1+M)}$, shown in grey in FIG. 5) by interpolating new segmentation lines 302 for those non-edited images and replacing the initial segmentation lines 302 with these new interpolated lines.

In general, 3D segmentation tools that support this interpolation approach apply a global interpolation for all pixels of each image 204. That is, the interpolation process discards the entireties of the initial segmentation lines 302 for the non-edited images $204_{(1+M)}$ and replaces those initial segmentations with segmentation lines 302 that are newly generated, in their entireties, based on linear interpolation of the new segmentations of the edited images $204_1$ and $204_N$ to the intermediate images $204_{(1+M)}$.

Figure 6:
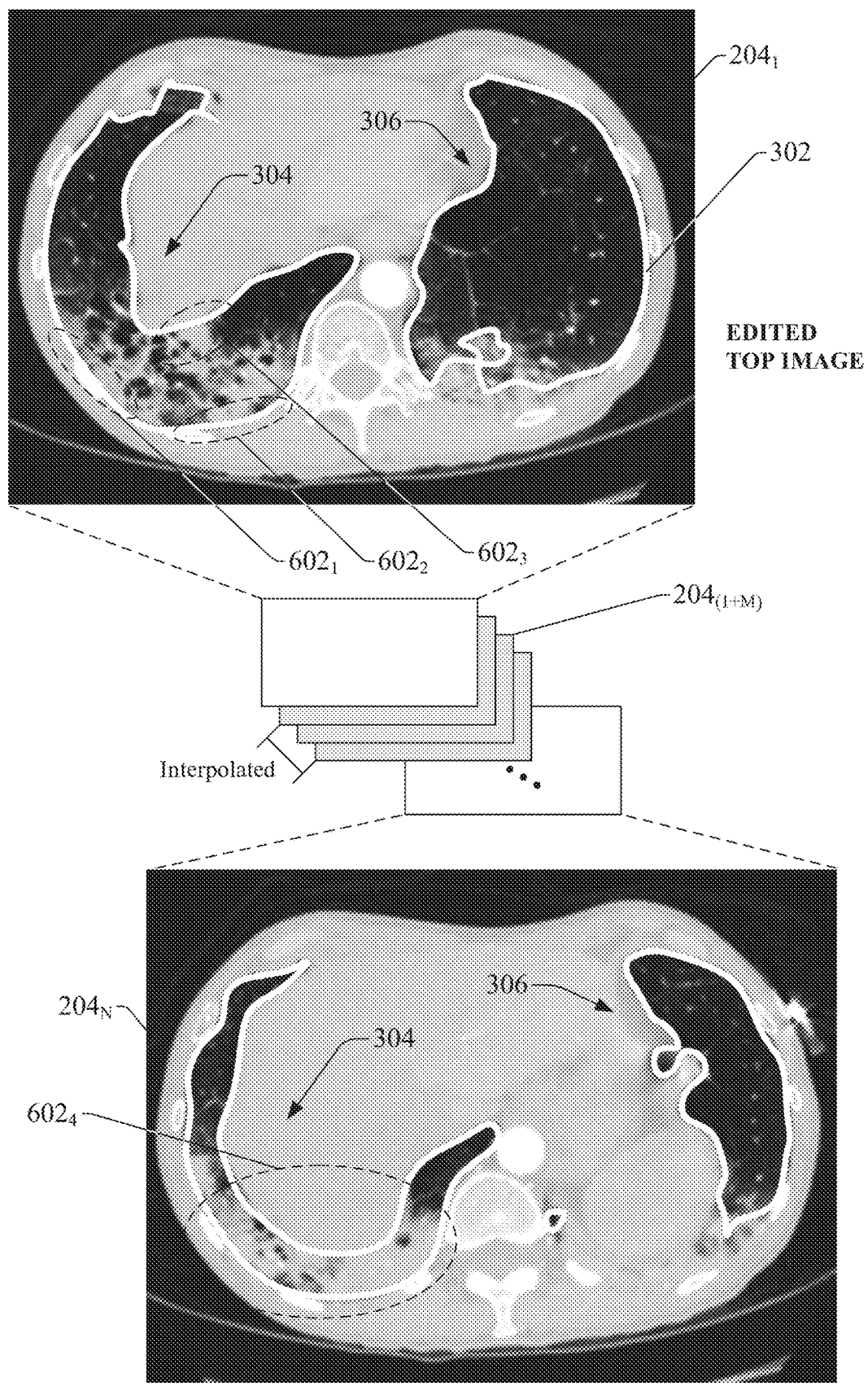
FIG. 6 illustrates another example scenario in which the 3D segmentations of a top image and a bottom image of a set of 2D image slices have been annotated.

However, this global interpolation approach can result in undesirable degradations of some portions of the interpolated segmentations on the non-edited images $204_{(1+M)}$. FIG. 6 illustrates another example scenario in which the segmentations of a top image $204_1$ and a bottom image $204_N$ of a stack of 2D images have been manually annotated. In this example, a user has manually edited a number of segmentation areas 602 in the top and bottom images $204_1$, $204_N$ relative to their initial 3D segmentations. The user has only applied edits to the right lung 304 in this example. Upon completion of these manual edits, the segmentations of the intermediate (non-edited) images $204_{(1+M)}$ are discarded and new segmentations are generated for those images based on global linear interpolation of the new edited segmentations of the top and bottom images $204_1$, $204_N$.

Figure 7:
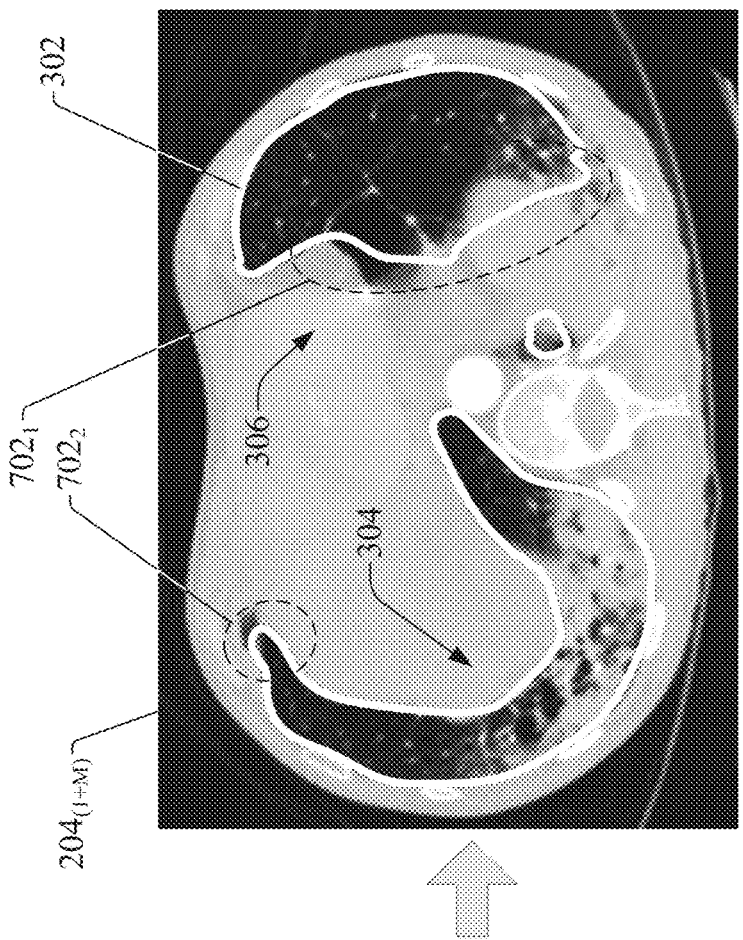
FIG. 7 is a comparison of an initial 3D segmentation and a new interpolated segmentation for an intermediate image of a set of 2D image slices.
Figure 7:
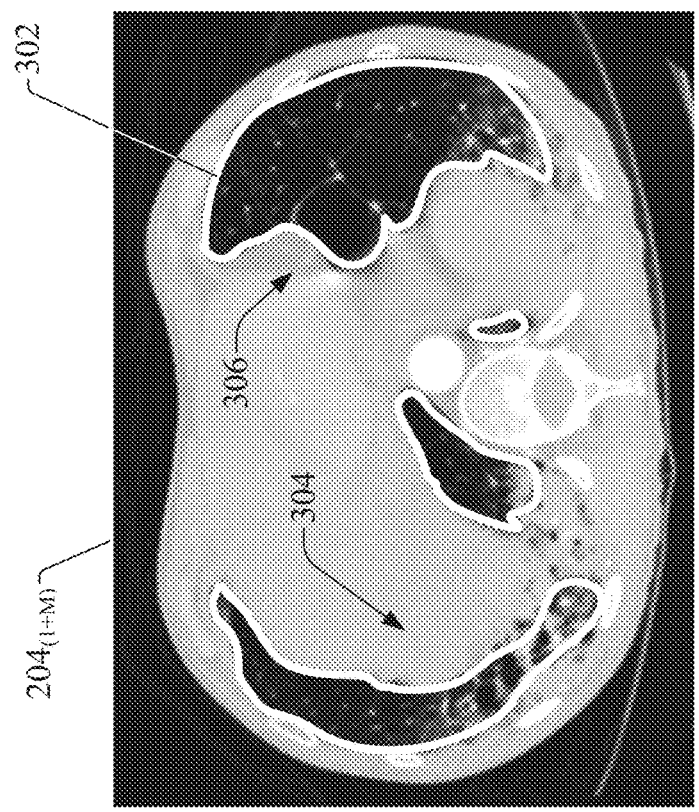

FIG. 7 is a comparison of the initial 3D segmentation and the new interpolated segmentation for one of the intermediate images $204_{(1+M)}$ in this example scenario. Even though only the segmentation lines 302 of the right lung 304 were edited in the top and bottom images $204_1$, $204_N$ (see edited areas 602 in FIG. 6), the global interpolation that was used to generate the new segmentations for the intermediate image $204_{(1+M)}$ has resulted in an undesired modification to the segmentation lines 302 of the left lung 306 (modified area $702_1$ in the right-side image of FIG. 7). Moreover, although the edited areas 602 of the top and bottom images $204_1$, $204_N$ were limited to the lower half of the axial cross-section of the right lung 304 (representing the rear of the lung 304), the global interpolation has resulted in a modification to the segmentation line 302 of the upper tip of the right lung 304 (modified area $702_2$ of the right-side image of FIG. 7). In general, the global interpolation applied by some 3D annotation systems can result in undesirable modifications to segmentation contours outside the edited areas in one or more intermediate images $204_{(1+M)}$, resulting in degraded segmentations in those images. This degradation can be particularly problematic in the case of complex three-dimensional shapes that render accurate interpolation difficult.

To address these and other issues, one or more embodiments of the 3D segmentation system 102 described herein can accurately update the 3D segmentations of non-edited images 204 to reflect segmentation edits applied to other images 204 using selective localized interpolation. In one or more embodiments, rather than overriding the entireties of the initial 3D segmentations of non-edited images 204 with newly generated, globally interpolated segmentations, the segmentation system 102 can apply a distance-based or connectivity-based criterion to the interpolation of segmentation edits, such that only portions of the segmentations of the non-edited images 204 that correspond to areas that were manually annotated in the edited images 204 (e.g., top and bottom images $204_1$ and $204_N$), or that correspond to contours that are connected to the manually edited areas, will be modified by the interpolation process, and the initial segmentations will be maintained outside of those edited areas. In this way, the system 102 effectively merges the interpolated segmentation with the initial segmentation for each non-edited image $204_N$) in a manner that mitigates unreliable modifications to the initial segmentations in areas far from the edited areas, or that are otherwise unrelated to the edited areas.

Figure 8:
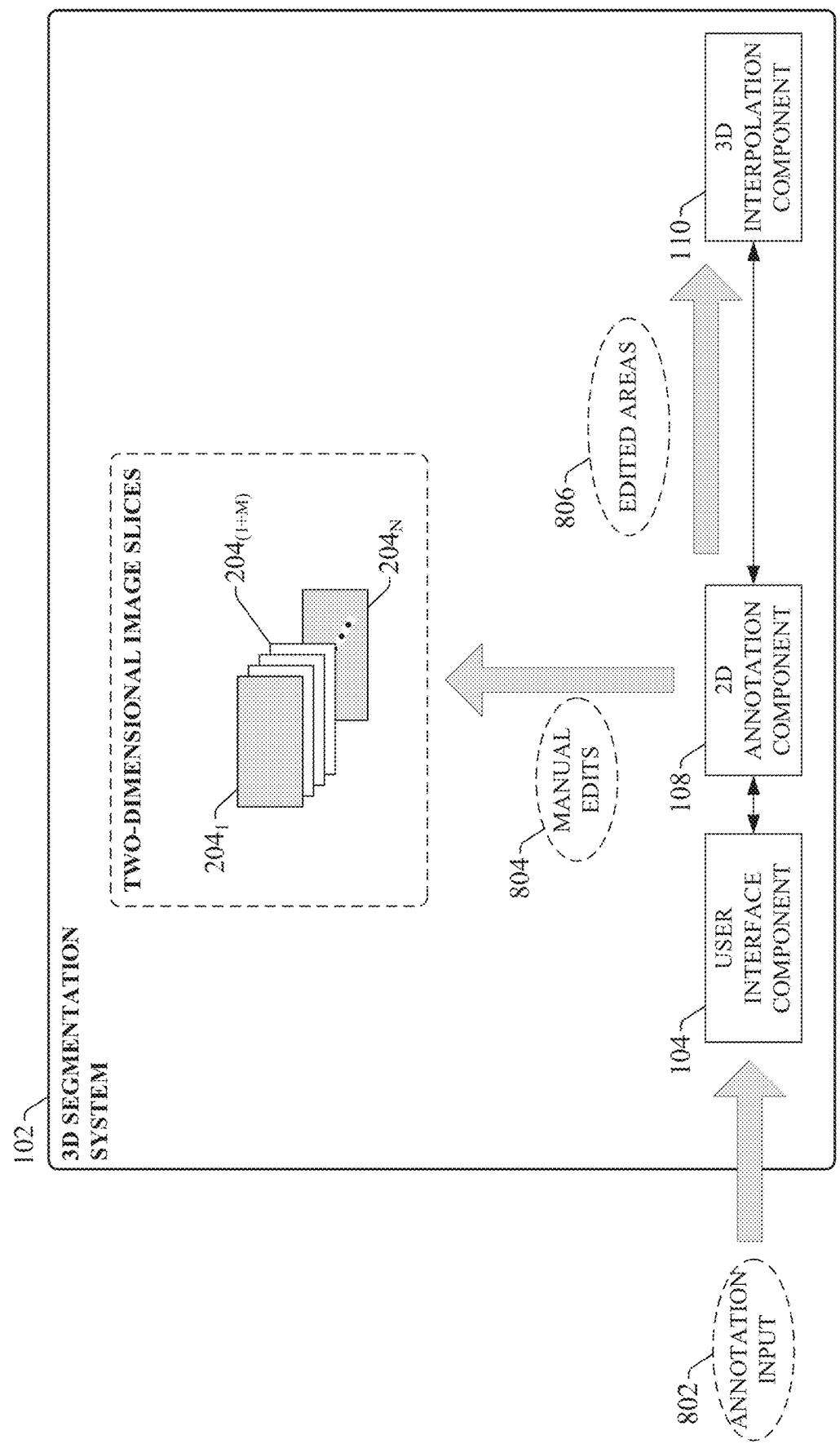
FIG. 8 is a data flow diagram illustrating manual annotation of selected 3D segmentations using a segmentation system.

FIG. 8 is a data flow diagram illustrating manual annotation of selected 3D segmentations using 3D segmentation system 102. In this example, a set of 2D images 204 (or image slices) have been obtained by performing a 3D scan of a subject. The 2D images 204 may comprise, for example, a set of axial images obtained by performing a CT scan of a patient, such that each image 204 represents an axial cross-section of the patient that, taken together, represent a 3D volume. In some scenarios, the images 204 may represent 2D planes that are different from the acquisition plane of the 3D scan. The images 204 can be imported into the system 102 by the imaging component 106 or may be generated by the imaging component 106 itself in some embodiments. As noted above, each of the 2D images 204 may have an initial segmentation that was generated based on analysis of the content of the images 204 (performed by the imaging component 106 or by a separate imaging system that generated the images 204). In some scenarios, this analysis may have been performed using neural networks, machine learning algorithms, or other such analytic tools that identify gradients, borders, or contours within the images 204, which may correspond to the contours of organs, tumors, or other areas of interest. The initial segmentations can comprise segmentation lines 302 that delineate these identified contours (see, e.g., FIG. 3b).

It is assumed that these initial segmentations do not accurately delineate the areas of interest within the images 204, and so manual editing or annotation of the segmentations is necessary. Accordingly, the user can submit annotation input 802 directed to the segmentations of selected images 204 via user interface component 104. In some embodiments, the user interface 104 can render editing display interfaces on a client device that allow the user, via interaction with the interfaces, to browse and view the images 204 or planes that make up the 3D scan, and to manually redraw or edit selected portions of the segmentations of selected images 204 using an interactive drawing tool (e.g., a drawing tool that allows the user to erase and/or draw segmentation lines 302 using a mouse-controlled cursor).

To mitigate the need to manually edit the initial segmentations of all the images 204, the user edits only a selected subset of the images 204—in this example, the top image $204_1$ and the bottom image $204_N$, depicted in grey in FIG. 8—and the system 102 will automatically propagate the annotations to the other images 204 via interpolation. Accordingly, based on the annotation input 802 submitted by the user, the 2D annotation component 108 applies the manual edits 804 defined by the annotation input 802 to the selected images $204_1$ and $204_N$. Although the present example assumes that the user has directed the manual annotations to the top image $204_1$ and bottom image $204_N$, the user may instead choose to apply the manual annotations to other images 204 of the stack. In general, the system 102 will use the interpolation technique described below to propagate edits to any non-edited images 204 based on manual edits applied to one or more of the other images 204, regardless of which images 204 have been manually annotated.

In addition to applying the manual edits 804 to the selected images $204_1$ and $204_N$, the 2D annotation component 108 also identifies and records the areas that were annotated within each edited image $204_1$, $204_N$. For example, returning briefly to the annotation example of FIG. 6, the 2D annotation component 108 can determine the areas 602 containing segmentation line segments that were manually edited by the user, and generate information 806 that identifies these edited areas 602. This information 806 will be used by the 3D interpolation component 110 to selectively modify corresponding areas of the other non-edited images $204_{(1+M)}$ based on the manual edits applied to images $204_1$ and $204_N$.

The 2D annotation component 108 can use any suitable technique to identify the manually edited areas of the top and bottom images $204_1$ and $204_N$. For example, in some embodiments the 2D annotation component 108 can compare the initial segmentation of each image $204_1$ and $204_N$ with the edited segmentation of that image, identify portions of the segmentation lines 302 that differ between the initial and edited segmentations, and generate information 806 identifying the areas within which these modifications reside. Information 806 can record the edited areas using any suitable convention for defining the areas. For example, information 806 may define, for each manually edited area of each image $204_1$ and $204_N$, the dimensions and position (within the image $204_1$, $204_N$) of a two-dimensional shape— e.g., a rectangle, an oval, or another 2D geometric shape— that encompasses the portions of the segmentation lines 302 that were modified by the manual edit, where the defined geometric shape is smaller than the entire area of the image $204_1$, $204_N$. In another example, the information 806 may define each edited portion of the segmentation as a pair of points along a segmentation line 302, where the section of the segmentation line 302 between the two points represents the edited section of the segmentation line 302. Other conventions for recording the edited areas of images $204_1$ and $204_N$ are within the scope of one or more embodiments.

Figure 9:
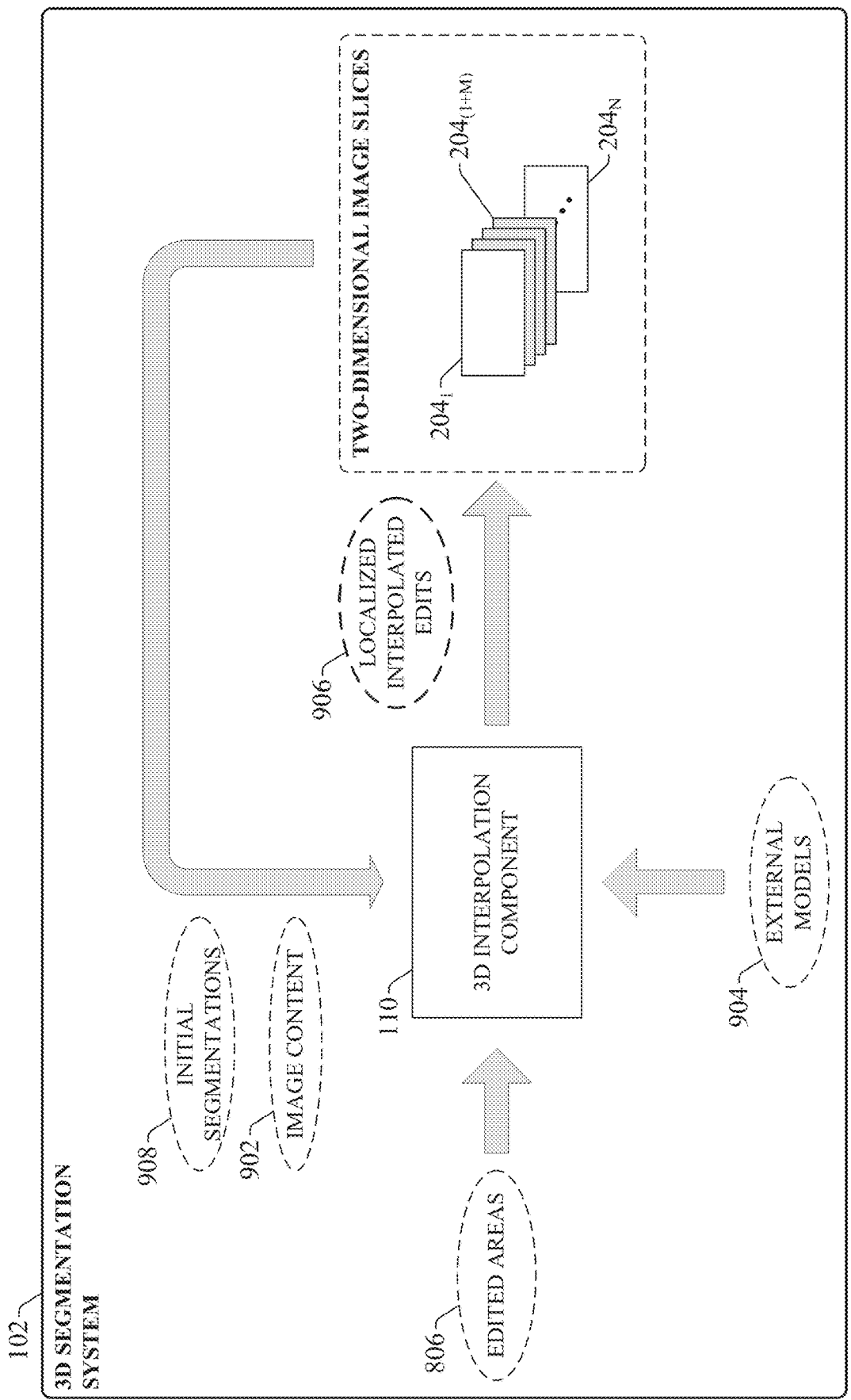
FIG. 9 is a data flow diagram illustrating propagation of manual edits to an intermediate (or other non-edited) image using localized interpolation.

Upon completion of manual editing, the system 102 propagates the manual annotations performed on the top and bottom images $204_1$ and $204_N$ across the 3D volume to the segmentations of the intermediate images $204_{(1+M)}$. FIG. 9 is a data flow diagram illustrating propagation of the manual edits to the intermediate (or other non-edited) images $204_{(1+M)}$ using localized interpolation. In contrast to the global interpolation approach described above, which discards the entireties of the initial 3D segmentations of the intermediate images $204_{(1+M)}$ and generates new interpolated segmentations for those images without considering the specific areas that were manually edited, 3D segmentation system 102 considers the areas of images $204_1$ and $204_N$ that were manually edited during the annotation stage (illustrated in FIG. 8) and maintains the portions of the initial segmentations of images $204_{(1+M)}$ that exceed a defined distance from those areas. Accordingly, the 3D interpolation component 110 takes, as input, the information 806 identifying the areas of the top and bottom images $204_1$ and $204_N$ that were manually edited, as well as the content 902 and initial segmentations 908 of the 2D images, and applies localized interpolated edits 906 to the initial segmentations of the respective intermediate (or non-edited) images $204_{(1+M)}$ based on this information.

Figure 10:
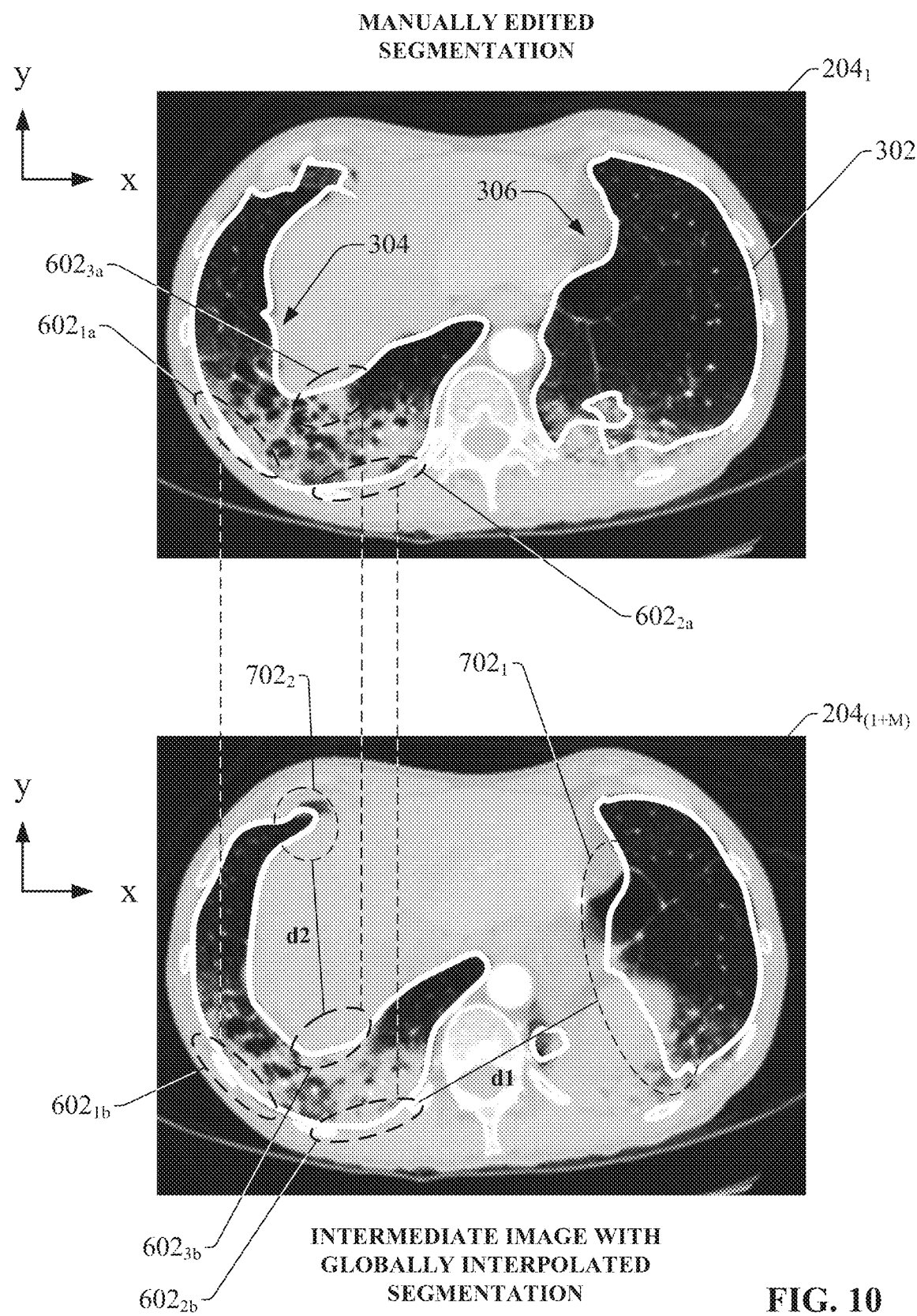
FIG. 10 depicts a top image that was manually edited together with an intermediate image of a set of 2D image slices.

In particular, 3D interpolation component 110 enforces a distance criterion, relative to the manually edited areas, when interpolating segmentation modifications for the intermediate images $204_{(1+M)}$, such that only portions of the segmentation lines 302 that are within areas corresponding to the manually edited areas—or that are within a defined distance from the manually edited areas—will be modified by the interpolation, and the initial segmentation lines 302 that are outside the manually edited areas are maintained. An example approach for achieving this localized interpolation is illustrated with reference to FIGS. 10 and 11. FIG. 10 depicts the top image $204_1$ that was manually edited as shown in FIG. 6 together with the intermediate image $204_{(1+M)}$ shown in FIG. 7. According to an example localized interpolation approach, after the user has completed manual editing of top image $204_1$ (as well as any other images 204 the user wishes to manually edit, such as bottom image $204_N$), 3D interpolation component 110 can first perform a global segmentation interpolation to each of the intermediate or non-edited images $204_{(1+M)}$ based on the resulting manually edited segmentation of image $204_1$. This global interpolation can be similar to that described above in connection with FIGS. 6 and 7, and may yield the modified segmentation shown in the right-side image of FIG. 7 (and reproduced as the bottom image of FIG. 10). This globally interpolated segmentation, which represents a provisional segmentation for the non-edited image $204_{(1+M)}$, includes undesired or degraded modifications within areas 702 that are outside the manually edited areas.

Rather than discard the initial segmentation of the intermediate image $204_{(1+M)}$ in favor of this globally interpolated segmentation, 3D interpolation component 110 can maintain the initial segmentation of the intermediate image $204_{(1+M)}$ for comparison with the provisional new segmentation that was generated via the global interpolation. Based on this comparison, the 3D interpolation component 110 can identify all portions of the intermediate image segmentation that were altered by the global interpolation relative to the initial segmentation. In the example depicted in FIG. 10, these altered portions include the areas $602_1$-$602_3$, which correspond to the manually edited areas of the top image $204_1$, as well as areas $702_1$ and $702_2$.

3D interpolation component 110 then applies a distance criterion to each of the altered areas of the segmentation and, for each altered area, either accepts or rejects the alteration based a determination of whether the altered area satisfies the distance criterion. In particular, the 3D interpolation component 110 accepts segmentation alterations that are within a defined distance of the areas 602 that were manually edited in image $204_1$ and rejects segmentation alterations that are outside this defined distance.

Referring to FIG. 10, the areas 602 that were manually edited in the top image $204_1$ are shown projected to the intermediate image $204_{(1+M)}$. In order to accurately determine the distances from the manually edited areas, 3D interpolation component 110 can project or translate the locations of the manually edited areas 602—reported in information 806—from the edited image $204_1$ to the intermediate image $204_{(1+M)}$. In the example depicted in FIG. 10, edited areas $602_{1a}$, $602_{2a}$, and $602_{3a}$ in the edited image $204_1$ corresponds to projected areas $602_{1b}$, $602_{2b}$, and $602_{3b}$ in the intermediate image $204_{(1+M)}$. In some embodiments, the 3D interpolation component 110 can project the locations of the edited areas 602 by defining the projected areas 602 to occupy the same locations within intermediate image $204_{(1+M)}$ as in the manually edited image $204_1$ relative to a common origin (e.g., the lower left corners of the images or a center point of the images). That is, the 3D interpolation component 110 can define the projected edited areas 602 to have the same x-y coordinates within the plane of the intermediate image $204_{(1+M)}$ as the x-y coordinates of the manually edited areas 602 within the plane of the manually edited image $204_1$ (as reported by information 806). Alternatively, some embodiments of 3D interpolation component 110 can also take into consideration the contours identified within the image content 902 when projecting the locations of the edited areas 602 to the intermediate image $204_{(1+M)}$. In such embodiments, the 3D interpolation component 110 may modify the x-y coordinates of the projected location of the edited area 602 if a contour on which the original manual edit was performed is determined to be in a different x-y location in the intermediate image $204_{(1+M)}$ relative to its corresponding contour in the edited image $204_1$. In such scenarios, the 3D interpolation component 110 can define the projected location of the edited area 602 such that the projected area encompasses a contour segment determined to correspond to the contour segment that was manually edited in the top image $204_1$, even if the location of that segment within the x-y plane of the image has changed relative to the edited image $204_1$ (e.g., due to the irregular shape of the cavity or organ).

With the projected areas of the manual edits established, the 3D interpolation component 110 can then determines distances d between each altered portion of the globally interpolated segmentation and each projected area $602_{1b}$, $602_{2b}$, and $602_{3b}$ corresponding to the manually edited areas $602_{1a}$, $602_{2a}$, and $602_{3a}$. These distances d are measured within the x-y plane of the image $204_{(1+M)}$. For example, in the intermediate image $204_{(1+M)}$ depicted in FIG. 10, the altered area $702_1$ is a distance d1 from manually edited area $602_{2b}$, while the altered area $702_2$ is a distance d2 from manually edited area $602_{3b}$. The alterations within the manually edited areas $602_{1b}$, $602_{2b}$, and $602_{3b}$ are assumed to have a distance of zero since these alterations correspond to the locations of the manual edits applied to image $204_1$.

The 3D interpolation component 110 can retain any segmentation alterations having at least one distance d from a manually edited area 602 that is less than a defined distance threshold $d_{max}$ and reject any segmentation alteration for which all distances d from the manually edited areas 602 exceed the defined distance threshold $d_{max}$. In the cases of altered areas $702_1$ and $702_2$ depicted in FIG. 10, distances d1 and d2 are determined to exceed the distance threshold $d_{max}$, and there are no other distances d between the altered areas $702_1$ and $702_2$ and the manually edited areas 602 that are below the distance threshold $d_{max}$. Based on this determination, the 3D interpolation component 110 will reject the interpolated alterations to those areas 702. On the other hand, the segmentation alterations that are within the projected areas 602 in the intermediate image $204_{(1+M)}$ are accepted, since the locations of these alterations correspond to the locations of the manual edits (areas 602) of the edited image 2041, and therefore have distances d of zero.

In some embodiments, the distance threshold $d_{max}$ can be defined to be sufficiently greater than zero that interpolated segmentation alterations within the manually edited areas 602 as well as alterations that are relatively near the manually edited areas 602 will be maintained. Alternatively, a lower distance threshold $d_{max}$ can be defined such that only alterations that are located within the manually edited areas 602 will be maintained and all other alterations will be discarded. In some embodiments, the user interface component 104 can allow the user to manually set the threshold distance threshold $d_{max}$ as desired, affording the user the ability to control the degree of localization that will be enforced on interpolated segmentation modifications. In general, interpolated alterations to the initial segmentation at areas that are relatively far from the manually edited areas 602 are assumed to have a low likelihood of being accurate, and are therefore discarded in favor of the initial segmentations for those areas. Alterations that correspond to, or are proximate to, the manually edited areas are granted a high confidence of being accurate and are therefore maintained.

In addition to or as an alternative to the distance criterion, some embodiments of 3D interpolation component 110 can apply a connectivity criterion relative to the edited areas 602. This connectivity criterion can consider the contours within the images 204, such that the 3D interpolation component 110 accepts segmentation alterations that correspond to contours that are connected to a manually edited area 602 and rejects segmentation alterations that are not connected to an edited area 602 via a common contour. In some embodiments this connectivity criterion can be applied without the distance criterion described above, while in other embodiments the 3D interpolation component 110 can apply a blended set of criteria that consider both distance and connectivity. In general, any suitable relationship criterion relative to manually edited areas 602—e.g., distance-based and/or connectivity-based criteria—can be applied by the 3D interpolation component 110 to determine which segmentations alterations will be accepted and which will be reverted back to their initial segmentations.

Figure 11:
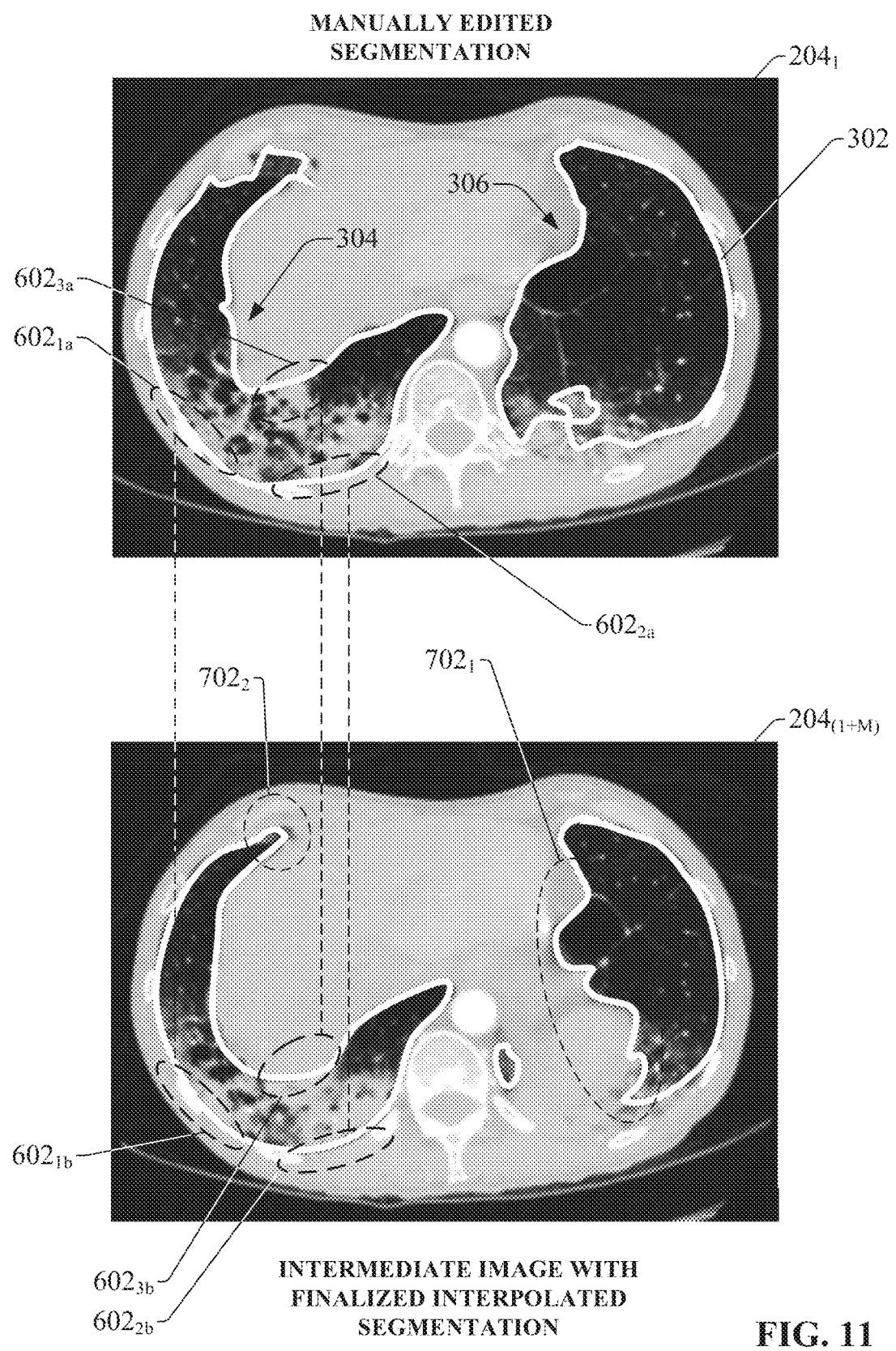
FIG. 11 depicts a top image that was manually edited together with a finalized intermediate image after rejected segmentation alterations have been reverted back to their initial segmentations.

Any segmentation alterations that are rejected by the 3D interpolation component 110 due to failure to satisfy the distance (or connectivity) criterion are reverted back to their initial segmentation contours, such that the initial segmentations are preserved for those areas of the segmentation. FIG. 11 depicts the top image $204_1$ that was manually edited together with the finalized intermediate image $204_{(1+M)}$ after the rejected segmentation alterations have been reverted back to their initial segmentations. In this example, the segmentation alterations corresponding to the manually edited areas 602 are maintained, while the segmentation alterations corresponding to areas $702_1$ and $702_2$, which did not satisfy the distance criterion relative to the edited areas 602, have been reverted back to their initial contours. Thus, the interpolated segmentation for the intermediate image $204_{(1+M)}$ has been selectively merged with the initial segmentation for that image using a distance criterion that limits the degree to which global interpolation can degrade the overall segmentation. 3D interpolation component 110 can apply this localized interpolation technique to all non-edited images $204_{(1+M)}$ to propagate the manual edits to all non-edited images $204_{(1+M)}$.

It is to be appreciate that the particular approach described above in connection with FIGS. 10 and 11 for selectively blending the initial segmentation with the globally interpolated segmentation for the non-edited images $204_{(1+M)}$ is only to be exemplary, and that any computational approach for maintaining interpolated segmentation contours for areas that are within a defined distance from the manually edited areas and maintaining initial segmentation contours for areas that are outside the defined distance threshold are within the scope of one or more embodiments.

In some embodiments, rather than applying a binary selection criterion to each interpolated segmentation alteration—whereby each alteration is either rejected or accepted in its entirety—the 3D interpolation component 110 can gradate the interpolated alterations based on the distance of the alteration from one or more of the edited areas 602. For example, a segmentation alteration whose distance d from an edited area 602 is between zero and a first distance threshold indicative of a high level of confidence in the alteration's validity can be accepted in its entirety by the 3D interpolation component 110, while an alteration whose distance d is between the first distance threshold and a second distance threshold indicative of a moderate level of confidence in the alteration's validity can be modified by the 3D interpolation component 110 to attenuate the degree of alteration without rejecting the alteration in its entirety. For example, the 3D interpolation component 110 can apply an averaging algorithm to the altered portion of the segmentation and that portion's initial segmentation, such that the resulting contour of that portion of the segmentation is an average or blend of the interpolated contour and the initial contour. In such embodiments, the interpolated contour and the initial contour can each be weighted differently by the averaging algorithm based on the distance d, such that the interpolated contour is given a greater weight than the initial contour for smaller values of distance d, and the initial contour is given greater weight than the interpolated contour for larger values of distance d.

Returning to FIG. 9, some embodiments of the 3D interpolation component 110 can also apply more advanced criteria for determining whether to accept or reject an interpolated alteration based on external models 904. These models 904 can include learning models (e.g., convolutional neural networks (CNN)) or digital models of the subject being imaged by the set of 2D images 204 (e.g., digital models of the organs or cavities being imaged).

The 3D segmentation system 102 described herein can facilitate efficient and accurate annotation of segmentations of 2D image slices or planes by preserving the initial segmentation of areas that were not subject to manual annotations or edits, and only accepting interpolated modifications to the segmentations of areas that correspond to, are sufficiently proximal to, or otherwise satisfy a relationship criterion relative to the manually edited areas. This can limit the effect of segmentation degradation that can be caused by global interpolation of the segmentations on non-edited image slices.

Figure 12A:
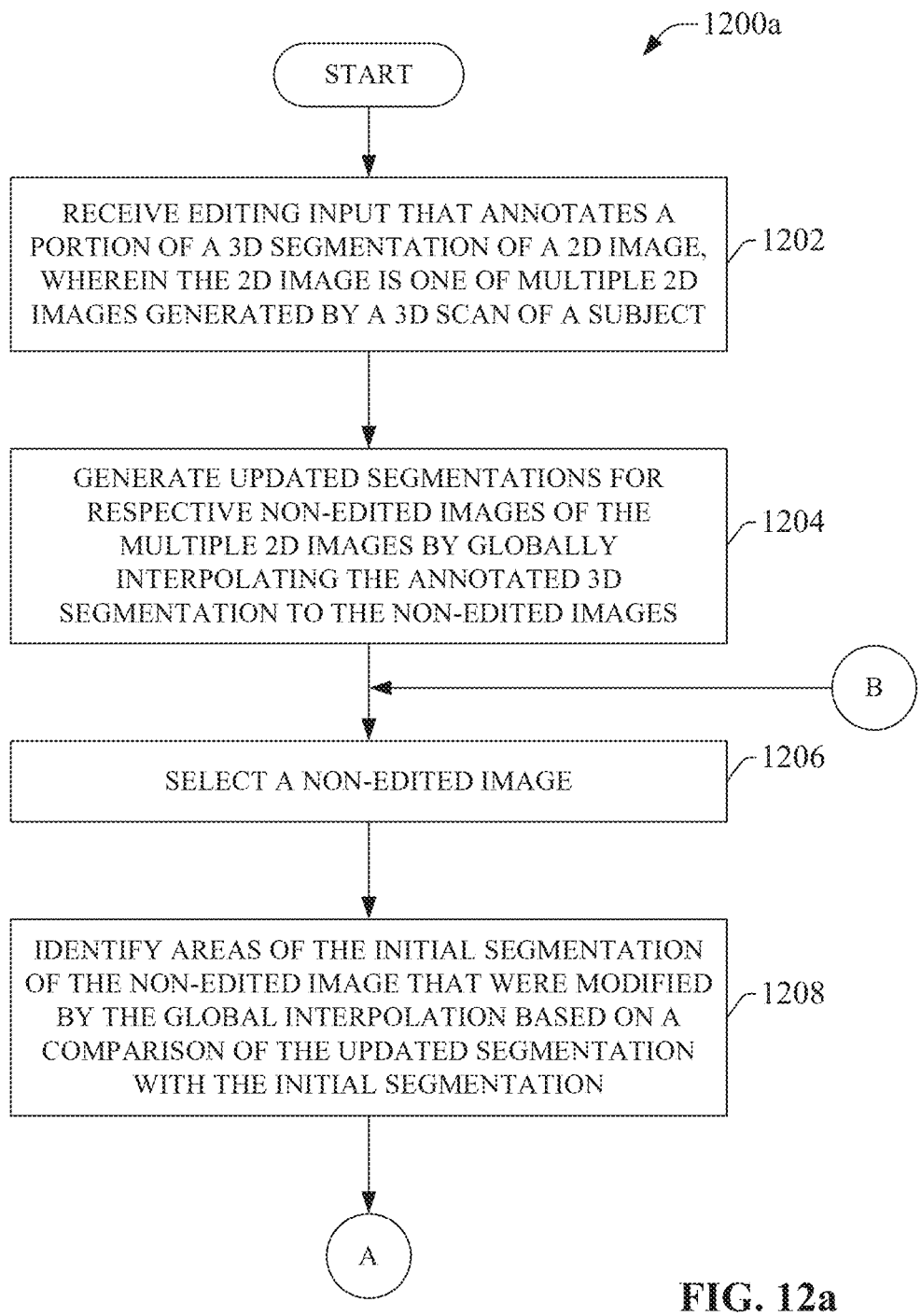
FIG. 12a is a flowchart of a first part of an example methodology for updating 3D segmentations of a set of 2D image slices of a 3D scan to reflect manual annotations applied to one or more of the image slices.
Figure 12B:
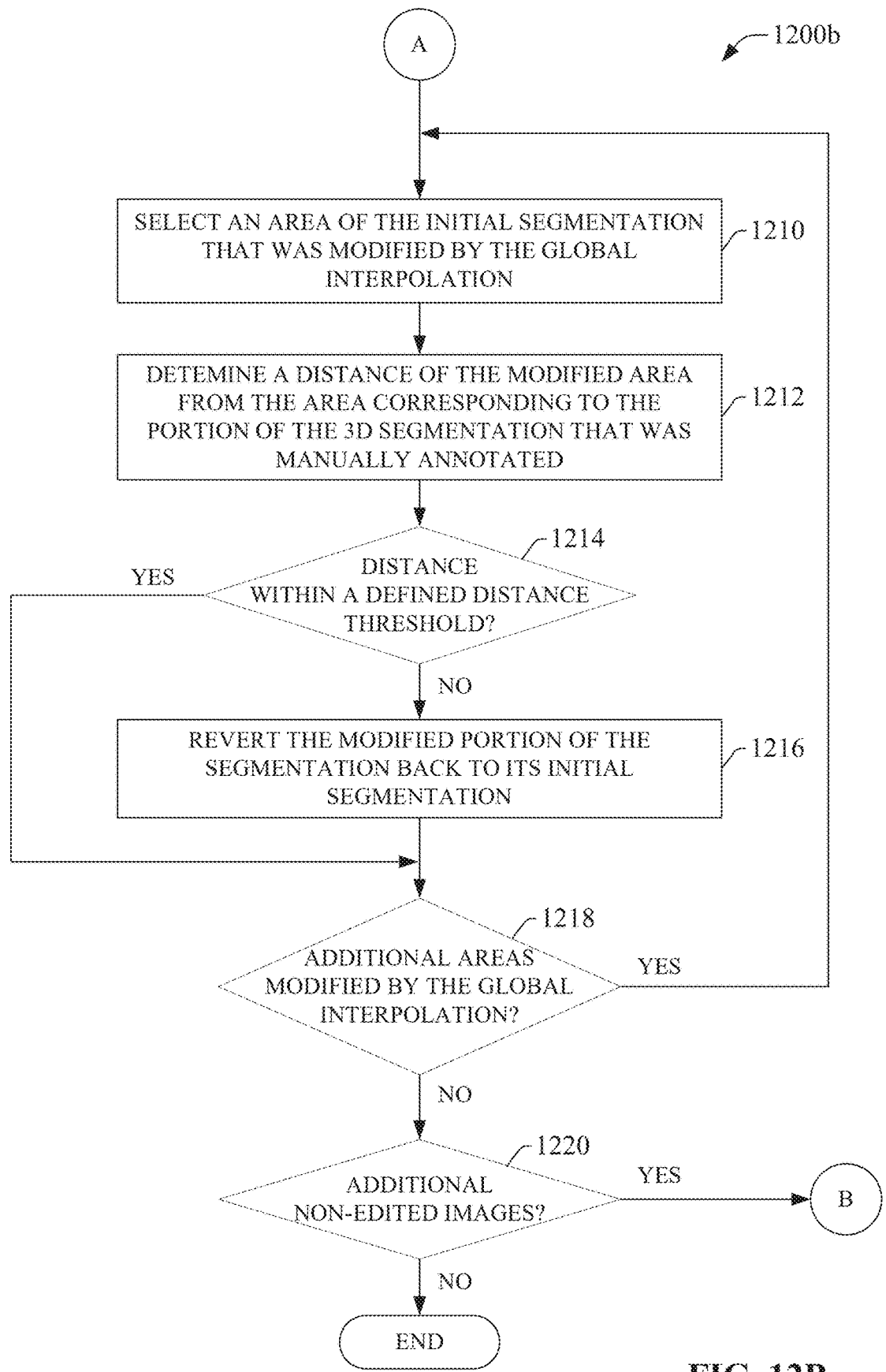
FIG. 12b is a flowchart of a second part of the example methodology for updating 3D segmentations of a set of 2D image slices of a 3D scan to reflect manual annotations applied to one or more of the image slices.

FIGS. 12*a*-12*b* illustrate a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 12*a* illustrates a first part of an example methodology 1200*a* for updating segmentations of a set of 2D image slices based on manual annotations applied to one or more of the image slices. Initially, at 1202, editing input is received that annotates a portion of a segmentation of a 2D image, where the 2D image is one of multiple 2D images or planes generated by performing a 3D scan of a subject. For example, the images may comprise respective image slices depicting axial or cross-sectional views of the scanned subject across a scanning range. The editing input may be received via user interaction with a suitable annotation tool that allows the user to modify selected portions of the segmentation of the selected 2D image; e.g., by modifying the contours of the selected portions of the segmentation.

At 1204, updated segmentations are generated for respective non-edited images of the multiple 2D images (that is, images other than the image that was annotated at step 1202) by globally interpolating the annotated 3D segmentation of the edited image to the non-edited images. The initial segmentations of these non-edited images are recorded in memory for subsequent comparison with the updated segmentations that are generated via this global interpolation. At 1206, a non-edited image is selected from among the non-edited 2D images. At 1208, areas of the initial segmentation of the selected non-edited image that were modified by the global interpolation are identified based on a comparison of the updated segmentation for the non-edited image and its initial segmentation.

The methodology then proceeds to the second part 1200*b* illustrated in FIG. 12*b*. At 1210, an area of the initial segmentation that was modified by the global interpolation is selected from among the areas identified at step 1208. At 1212, a distance of the selected modified area from the area corresponding to the portion of the segmentation that was manually annotated in the edited 2D image in step 1202 is determined. At 1214, a determination is made as to whether the distance determined at step 1212 is within a defined distance threshold. If the distance is not within the defined distance threshold (NO at step 1214), which indicates a low level of confidence that the interpolated segmentation modification is accurate, the methodology proceeds to step 1216, where the portion of the segmentation that was modified by the global interpolation (that is, the portion of the segmentation corresponding to the area selected at step 1210) is reverted back to its initial segmentation contours. The methodology then proceeds to step 1218. Alternatively, if the distance is within the defined distance threshold (YES at step 1214), which indicates a high level of confidence that the modification is accurate, the methodology proceeds directly to step 1218 without performing step 1216.

At 1218 a determination is made as to whether there are additional areas that were modified by the global interpolation (that is, additional areas identified at step 1208 whose distances have not be assessed). If there are additional areas (YES at step 1218), the methodology returns to step 1210, and steps 1210-1218 are repeated for a different modified area of the non-edited image. Alternatively, if all modified areas of the non-edited image have been assessed (NO at step 1218), the methodology proceeds to step 1220, where a determination is made as to whether there are additional non-edited images of the 3D scan that have not been processed by steps 1210-1218. If there are additional non-edited images to process (YES at step 1220) the methodology returns to step 1206, where another non-edited image is selected and steps 1208-1218 are performed for the next selected image. Alternatively, if all non-edited images have been processed (NO at step 1220), the methodology ends.

Although the methodology depicted in FIGS. 12A and 12B apply a distance-based criterion at steps 1212-1216, some embodiments may apply a connectivity-based criterion in addition to or as an alternative to the distance-based criterion. In an example embodiments, the methodology may determine whether the area selected at step 1210 is connected to the modified area via a common contour, and will revert the modified portion at step 1216 if the selected area does not satisfy this connectivity criterion.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 13:
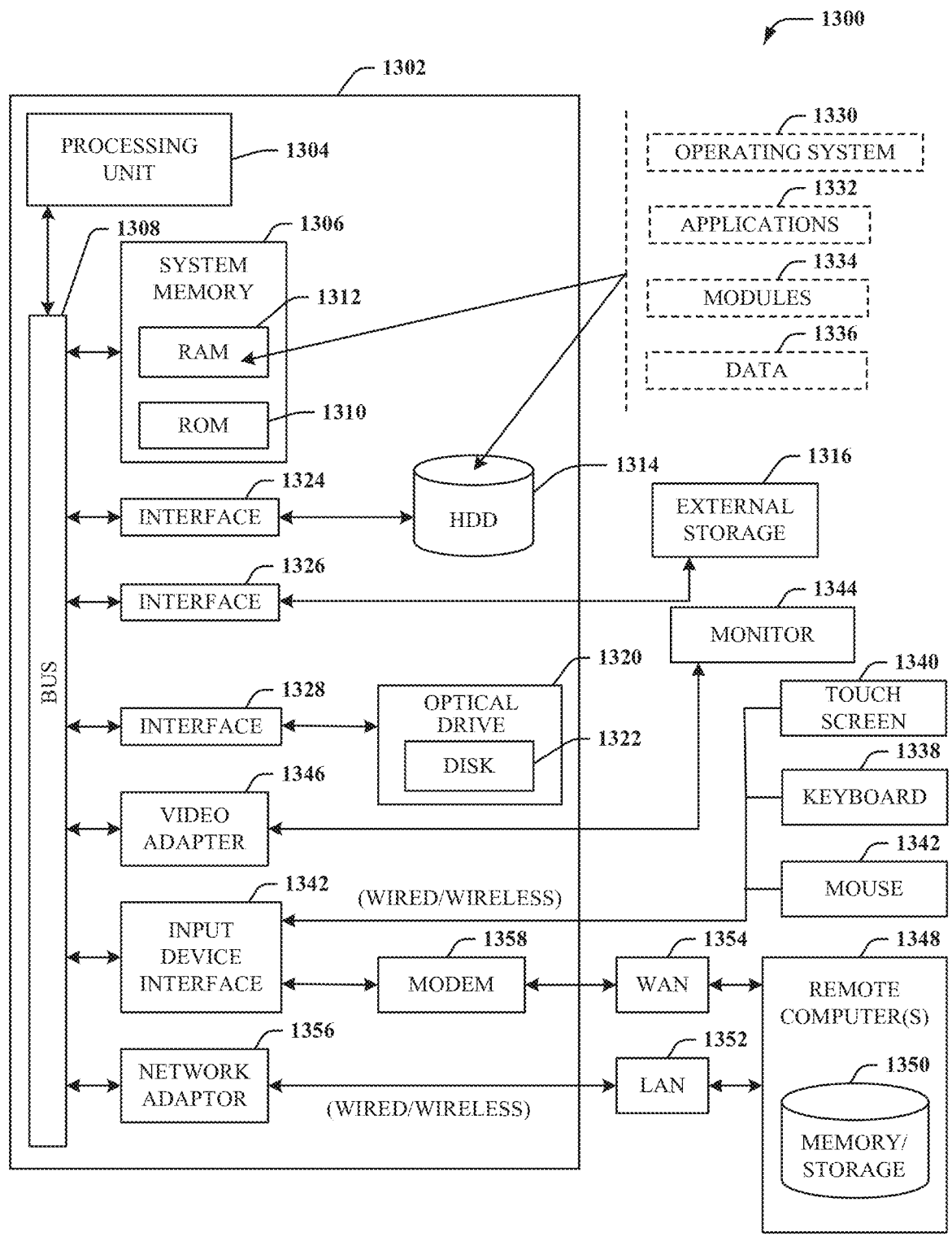
FIG. 13 is an example computing environment.
Figure 14:
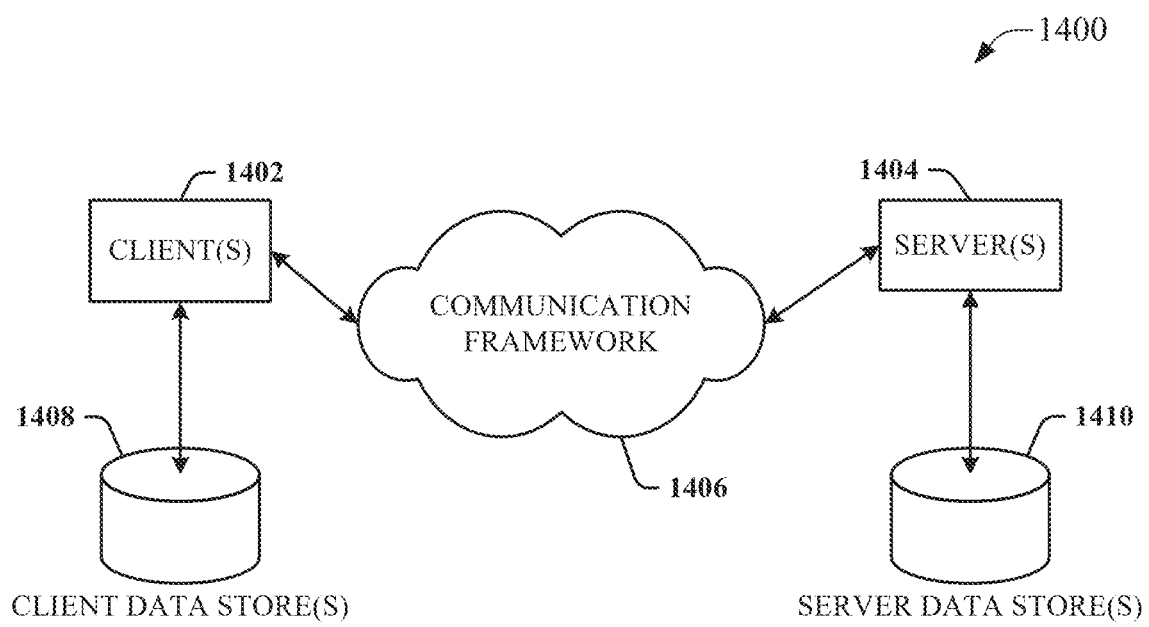
FIG. 14 is an example networking environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13 the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for application programs 1332. Runtime environments are consistent execution environments that allow application programs 1332 to run on any operating system that includes the runtime environment. Similarly, operating system 1330 can support containers, and application programs 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless access point (AP) disposed thereon for communicating with the adapter 1356 in a wireless mode.

When used in a WAN networking environment, the computer 1302 can include a modem 1358 or can be connected to a communications server on the WAN 1354 via other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1352 or WAN 1354 e.g., by the adapter 1356 or modem 1358, respectively. Upon connecting the computer 1302 to an associated cloud storage system, the external storage interface 1326 can, with the aid of the adapter 1356 and/or modem 1358, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 14 is a schematic block diagram of a sample computing environment 1400 with which the disclosed subject matter can interact. The sample computing environment 1400 includes one or more client(s) 1402. The client(s) 1402 can be hardware and/or software (e.g., threads, processes, computing devices). The sample computing environment 1400 also includes one or more server(s) 1404. The server(s) 1404 can also be hardware and/or software (e.g., threads, processes, computing devices). The servers 1404 can house threads to perform transformations by employing one or more embodiments as described herein, for example. One possible communication between a client 1402 and servers 1404 can be in the form of a data packet adapted to be transmitted between two or more computer processes. The sample computing environment 1400 includes a communication framework 1406 that can be employed to facilitate communications between the client(s) 1402 and the server(s) 1404. The client(s) 1402 are operably connected to one or more client data store(s) 1408 that can be employed to store information local to the client(s) 1402. Similarly, the server(s) 1404 are operably connected to one or more server data store(s) 1410 that can be employed to store information local to the servers 1404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a user interface component configured to receive, via interaction with one or more display interfaces, annotation input that defines a manual edit to a segmentation of a two-dimensional (2D) image, wherein the 2D image is one of a set of 2D images of a three-dimensional (3D) scan of a subject;
a 2D annotation component configured to apply the manual edit to the segmentation to yield an edited segmentation for the 2D image;
a 3D interpolation component configured to modify an initial segmentation of a non-edited image, of the set of 2D images, by interpolating the edited segmentation to the non-edited image to yield an updated segmentation for the non-edited image,
wherein the 3D interpolation component is configured to:
maintain contours of the initial segmentation for portions of the updated segmentation that do not satisfy a relationship criterion relative to an area corresponding to the manual edit,
modify contours, based on the interpolating, for portions of the updated segmentation that satisfy the relationship criterion relative to the area corresponding to the manual edit, and
in response to determining that an interpolated contour of a portion of the updated segmentation is between a first distance from the area corresponding to the manual edit and a second distance from the area, blend the interpolated contour with a contour of the initial segmentation to yield a blended contour.

2. The system of claim 1, wherein the relationship criterion is a distance criterion, and the 3D interpolation component is further configured to:
   maintain contours of the initial segmentation for portions of the updated segmentation that are located outside a defined distance from the area corresponding to the manual edit, and
   modify contours, based on the interpolating, for portions of the updated segmentation that are located within the defined distance.

3. The system of claim 1, wherein the relationship criterion is a connectivity criterion, and the 3D interpolation component is further configured to:
   maintain contours of the initial segmentation for portions of the updated segmentation that are not connected to the area corresponding to the manual edit via a common contour, and
   modify contours, based on the interpolating, for portions of the updated segmentation that are connected to the area corresponding to the manual edit via a common contour.

4. The system of claim 1, wherein the 3D interpolation component is further configured to:
   generate a provisional segmentation for the non-edited image based on a global interpolation of the edited segmentation, and
   revert portions of the provisional segmentation that do not satisfy the relationship criterion to their corresponding contours of the initial segmentation.

5. The system of claim 2, wherein the 3D interpolation component is further configured to:
   identify a portion of the provisional segmentation that differs relative to the initial segmentation based on a comparison of the provisional segmentation with the initial segmentation, and
   revert the portion of the provisional segmentation to its corresponding contour of the initial segmentation in response to determining that the portion does not satisfy the relationship criterion.

6. The system of claim 1, wherein the 3D interpolation component is configured to:
   translate the area corresponding to the manual edit from the 2D image to the non-edited image to yield a projected area, and
   determine whether the portions of the updated segmentation are located outside or within the defined distance from the projected area.

7. The system of claim 1, wherein the 3D interpolation component is further configured to determine whether to maintain contours of the initial segmentation or to maintain interpolated contours for respective portions of the updated segmentation based on a digital model of the of the subject.

8. The system of claim 1, wherein the set of 2D images comprises medical images generated by a computed tomography scan.

9. A method, comprising:
   receiving, by a system comprising a processor via interaction with one or more display interfaces, annotation input that defines a manual edit to a segmentation of a two-dimensional (2D) image, wherein the 2D image is one of a set of 2D images of a three-dimensional (3D) scan of a subject;
   applying, by the system, the manual edit to the segmentation to yield an edited segmentation for the 2D image; and
   modifying, by the system, an initial segmentation of a non-edited image, of the set of 2D images, by interpolating the edited segmentation to the non-edited image to yield an updated segmentation for the non-edited image, wherein the modifying comprises:
      determining whether to maintain contours of the initial segmentation or to maintain interpolated contours for respective portions of the updated segmentation based on a digital model of the subject and a relationship criterion, comprising:
         in response to determining that a first portion of the updated segmentation does not satisfy a relationship criterion relative to an area corresponding to the manual edit, maintaining a contour of the initial segmentation for the first portion,
         in response to determining that a second portion of the updated segmentation satisfies the relationship criterion, modifying the second portion in accordance with the interpolating, and
         in response to determining that an interpolated contour of a portion of the updated segmentation is between a first distance from the area corresponding to the manual edit and a second distance from the area, blend the interpolated contour with a contour of the initial segmentation to yield a blended contour.

10. The method of claim 9, wherein the relationship criterion is a distance relationship, and the modifying further comprises:
    maintaining the contour of the initial segmentation for the first portion in response to determining that the first portion is located at a distance from the area corresponding to the manual edit that exceeds a distance threshold, and
    modifying the second portion in accordance with the interpolating in response to determining that the second portion is located at a distance from the area that is less than the distance threshold.

11. The method of claim 9, wherein the relationship criterion is a connectivity relationship, and the modifying further comprises:
    maintaining the contour of the initial segmentation for the first portion in response to determining that the first portion is not connected to the area corresponding to the manual edit via a common contour, and
    modifying the second portion in accordance with the interpolating in response to determining that the second portion is connected to the area corresponding to the manual edit via a common contour.

12. The method of claim 9, wherein the modifying further comprises:
    generating a provisional segmentation for the non-edited image based on a global interpolation of the edited segmentation, and
    replacing portions of the provisional segmentation that do not satisfy the relationship criterion with their corresponding contours of the initial segmentation.

13. The method of claim 12, wherein the modifying further comprises:
    identifying a portion of the provisional segmentation that differs relative to the initial segmentation based on a comparison of the provisional segmentation with the initial segmentation, and in response to determining that the portion does not satisfy the relationship criterion, replacing the portion of the provisional segmentation with its corresponding contour of the initial segmentation.

14. The method of claim 9, wherein the modifying further comprises:
translating the area corresponding to the manual edit from the 2D image to the non-edited image to yield a projected area, and
determining whether the first portion and the second portion of the updated segmentation are located outside or within the defined distance from the projected area.

15. The method of claim 9, wherein the modifying further comprises determining whether to maintain contours of the initial segmentation or to maintain interpolated contours for respective portions of the updated segmentation based on a digital model of the of the subject.

16. The method of claim 1, wherein the set of 2D images comprises medical images generated by a computed tomography scan.

17. A non-transitory computer-readable medium having stored thereon executable instructions that, in response to execution, cause a system comprising at least one processor to perform operations, the operations comprising:
receiving, via interaction with one or more display interfaces, annotation input that defines a manual edit to a segmentation of a two-dimensional (2D) image, wherein the 2D image is one of a set of 2D images of a three-dimensional (3D) scan of a subject;
modifying the segmentation of the 2D image in accordance with the manual edit to yield an edited segmentation for the 2D image; and
modifying an initial segmentation of a non-edited image, of the set of 2D images, by interpolating the edited segmentation to the non-edited image to yield an updated segmentation for the non-edited image, wherein the modifying comprises:
maintaining contours of the initial segmentation for portions of the updated segmentation that do not satisfy a relationship criterion relative to an area corresponding to the manual edit,
modifying contours for portions of the updated segmentation that satisfy the relationship criterion based on the interpolating, and
in response to determining that an interpolated contour of a portion of the updated segmentation is between a first distance from the area corresponding to the manual edit and a second distance from the area, blend the interpolated contour with a contour of the initial segmentation to yield a blended contour.

18. The non-transitory computer-readable medium of claim 17, wherein the modifying comprises:
generating a provisional segmentation for the non-edited image based on a global interpolation of the edited segmentation, and
replacing portions of the provisional segmentation that do not satisfy the relationship criterion with their corresponding contours of the initial segmentation.

19. The non-transitory computer-readable medium of claim 17, wherein the modifying further comprises: identifying a portion of the provisional segmentation that differs relative to the initial segmentation based on a comparison of the provisional segmentation with the initial segmentation, and in response to determining that the portion does not satisfy the relationship criterion, replacing the portion of the provisional segmentation with its corresponding contour of the initial segmentation.

20. The non-transitory computer-readable medium of claim 17, wherein the modifying further comprises: translating the area corresponding to the manual edit from the 2D image to the non-edited image to yield a projected area, and determining whether the first portion and the second portion of the updated segmentation are located outside or within the defined distance from the projected area.

* * * * *